(12) United States Patent
Engelnkemper et al.

(10) Patent No.: US 12,536,882 B2
(45) Date of Patent: Jan. 27, 2026

(54) SELF-SERVICE CHECKOUT TERMINAL, AND METHOD

(71) Applicant: Wincor Nixdorf International GmbH, Paderborn (DE)

(72) Inventors: Sebastian Engelnkemper, Langenberg (DE); Alexander Knobloch, Paderborn (DE); Jonathan Stieber, Paderborn (DE)

(73) Assignee: Wincor Nixdorf International GmbH, Paderborn (DE)

( * ) Notice: Subject to any disclaimer, the term of this patent is extended or adjusted under 35 U.S.C. 154(b) by 519 days.

(21) Appl. No.: 17/786,205

(22) PCT Filed: Dec. 7, 2020

(86) PCT No.: PCT/EP2020/084873
§ 371 (c)(1),
(2) Date: Aug. 31, 2022

(87) PCT Pub. No.: WO2021/122101
PCT Pub. Date: Jun. 24, 2021

(65) Prior Publication Data
US 2024/0005292 A1 Jan. 4, 2024

(30) Foreign Application Priority Data
Dec. 17, 2019 (EP) .................. 19217166

(51) Int. Cl.
*G07G 1/00* (2006.01)
*G06Q 20/18* (2012.01)
(Continued)

(52) U.S. Cl.
CPC .......... *G07G 1/0054* (2013.01); *G06Q 20/18* (2013.01); *G06Q 20/208* (2013.01); *G06T 7/20* (2013.01);
(Continued)

(58) Field of Classification Search
CPC ...... G06Q 20/4016; G07G 1/001; G06F 3/01; G06T 7/02; G10L 15/25
See application file for complete search history.

(56) References Cited

U.S. PATENT DOCUMENTS 10,699,421 B1 * 6/2020 Cherevatsky ....... G06F 18/2113
10,956,726 B1 * 3/2021 Quark .................. G06V 20/653
(Continued)

FOREIGN PATENT DOCUMENTS

EP 3379505 A1 * 9/2018 ........... G07G 1/0036

OTHER PUBLICATIONS

International Search Report filed in the corresponding PCT Application dated Dec. 15, 2020, written in the German language; 4 pages.

(Continued)

*Primary Examiner* — Florian M Zeender
*Assistant Examiner* — Anessa Deligi
(74) *Attorney, Agent, or Firm* — Black McCuskey

(57) ABSTRACT

In accordance with various embodiments, a self-service checkout terminal can comprise: an image capture device configured to capture image data of a capture region; a product capture device for capturing a product identifier of a product in the capture region when the product is presented to the product capture device; a control device configured: for determining payment information on the basis of the product identifier; for determining a movement pattern on the basis of the image data, wherein the movement pattern represents a movement of a product in the capture region; for determining an indication about a trustworthiness of the payment information on the basis of the movement pattern.

11 Claims, 14 Drawing Sheets

(51) Int. Cl.
  *G06Q 20/20* (2012.01)
  *G06T 7/20* (2017.01)
  *G06V 10/20* (2022.01)
  *G06V 10/764* (2022.01)
  *G06V 10/82* (2022.01)
  *G06V 20/68* (2022.01)
  *G06V 40/20* (2022.01)
  *G07G 1/12* (2006.01)

(52) U.S. Cl.
  CPC .......... *G06V 10/255* (2022.01); *G06V 10/764* (2022.01); *G06V 10/82* (2022.01); *G06V 40/28* (2022.01); *G07G 1/12* (2013.01); *G06T 2207/30196* (2013.01); *G06T 2207/30232* (2013.01); *G06V 20/68* (2022.01)

(56) References Cited

U.S. PATENT DOCUMENTS

| 2006/0243798 | A1* | 11/2006 | Kundu | G07G 3/00 235/383 |
| 2016/0210829 | A1* | 7/2016 | Uchida | G08B 13/19645 |
| 2018/0240092 | A1* | 8/2018 | Miyagi | G07G 1/0045 |
| 2019/0258870 | A1 | 8/2019 | Kundu | |
| 2023/0386307 | A1* | 11/2023 | Todescato | G07G 1/0045 |

OTHER PUBLICATIONS

International Search Report filed in the corresponding PCT Application dated Dec. 15, 2020, translated to the English language; 3 pages.

Written Opinion filed in the corresponding PCT Application dated Dec. 15, 2020, written in the German language; 7 pages.

* cited by examiner

SELF-SERVICE CHECKOUT TERMINAL, AND METHOD

CROSS-REFERENCE TO RELATED APPLICATIONS

This application is a National Phase filing of International Application Ser. No. PCT/EP2020/084873, for a SELF-SERVICE CHECKOUT TERMINAL, AND METHOD, filed 2020 Dec. 7.

BACKGROUND

Various exemplary embodiments relate to a self-service checkout terminal and to a method.

In conventional retail trade, a self-service checkout terminal affords customers the possibility of scanning the desired products themselves (e.g., without assistance) or alternatively of receiving assistance from an employee when scanning the products. Although such a self-service checkout terminal causes a longer checkout and payment process, in return it ensures more anonymity for customers, a shortening of the time waiting in a queue, a higher throughput relative to the entire branch and lower personnel costs for the retail trade. With a self-service checkout terminal, the bar codes of the products to be bought are not necessarily scanned by a cashier, but rather by each of the customers themselves.

Unfortunately, when a self-service checkout terminal is used, economic losses may arise if articles are intentionally or unintentionally not scanned or registered. That is conventionally counteracted by means of a so-called weight comparison, in which a reference weight is compared with the weight of the scanned article and deviations are detected. This involves detecting the weight of the article by means of so-called security scales before and/or after the scanning of the article. If the weight of the scanned article does not correspond to that expected reference weight, it is assumed that the customer has not scanned the article that said customer wanted to purchase.

SUMMARY

In accordance with various embodiments, illustratively it has been recognized that the applicability of the weight comparison is very limited. For example, the entire process of scanning the article, e.g., removing the article from the shopping basket and/or moving the article into the scanning region, is not monitored. Security gaps remain as a result, and so it is not possible to recognize for example if an article is removed directly from the shopping basket and kept back by the customer without being scanned. More complex deception attempts where the customer deliberately interchanges articles of similar weights are likewise not recognized.

Illustratively, in accordance with various embodiments, the way in which the article is removed, scanned and put down again is monitored (i.e. the movement of said article is monitored) in order to recognize whether a deception attempt might be present. If the movement pattern of the article that is determined in the process deviates too much from the expected pattern (also referred to as a reference pattern), an employee can be notified of this by means of an alarm. The employee can then check whether the discrepancy is based on an oversight on the part of the customer or an actual deception attempt. Relatively small discrepancies (illustratively suspicious circumstances) determined in this way, which considered individually do not yet justify assumption of a deception attempt, can likewise be aggregated. If the sum of the discrepancies then exceeds a certain threshold value, an alarm can likewise be triggered.

This monitoring can be effected optically by analyzing image data. In accordance with various embodiments, the complexity of the image data can be reduced by filtering out the image constituents that only show the environment, by means of a comparison with depth information. This achieves the effect that the complexity of the quantity of data to be analyzed is reduced and fewer disturbance variables occur (the quantity of data can remain the same, for example).

In accordance with various embodiments, a self-service checkout terminal (also referred to for short as SS checkout terminal or self-check-out terminal) can comprise: an image capture device configured to capture image data of a capture region; a product capture device for capturing a product identifier of a product in the capture region when the product is presented to the product capture device; a control device configured: for determining payment information on the basis of the product identifier; for determining a movement pattern on the basis of the image data, wherein the movement pattern represents a movement (e.g., of a product and/or of a hand) in the capture region; for determining an indication about a trustworthiness of the payment information on the basis of the movement pattern.

BRIEF DESCRIPTIONS OF THE DRAWINGS

Figure 4:
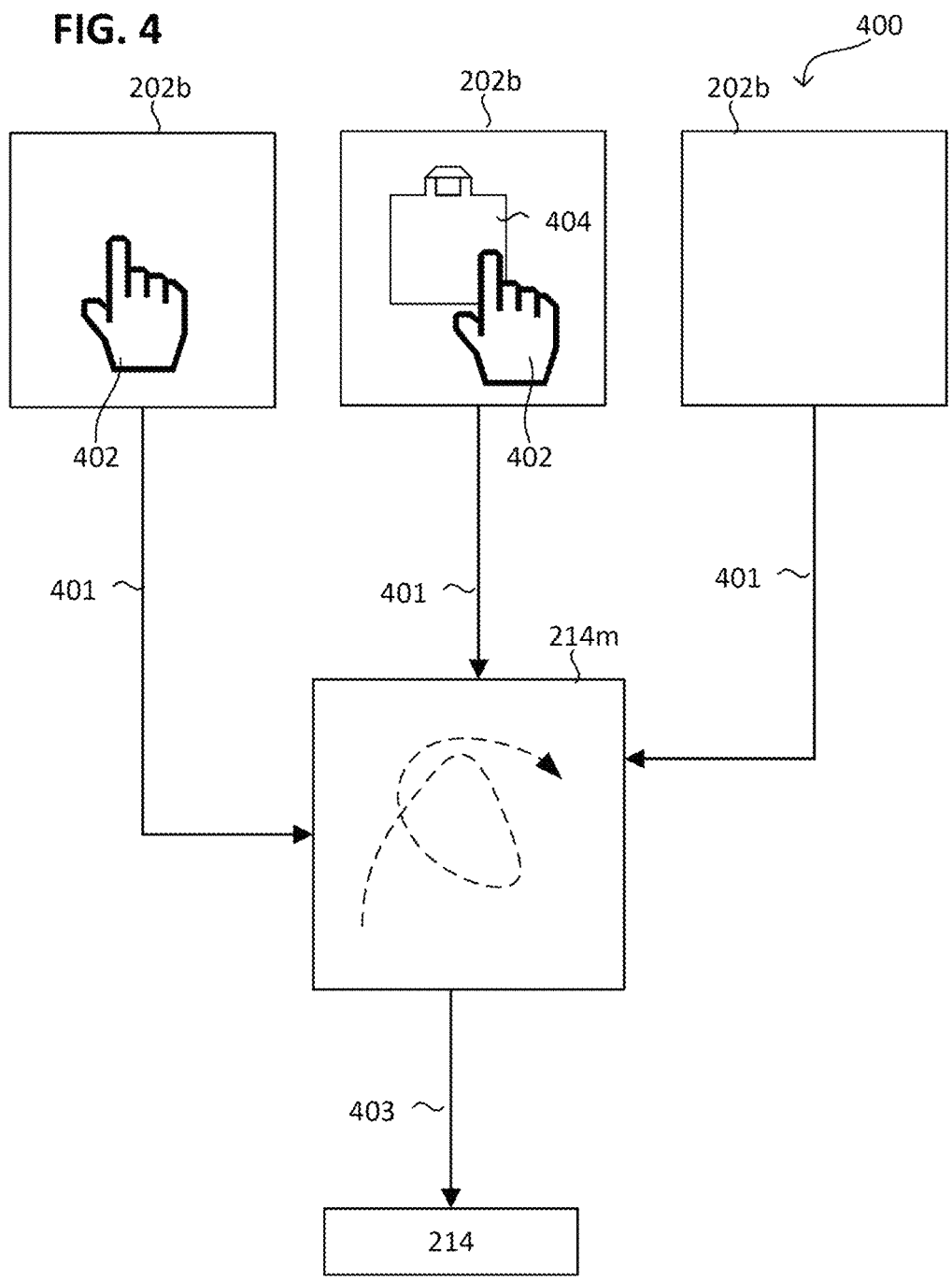
Figure 5:
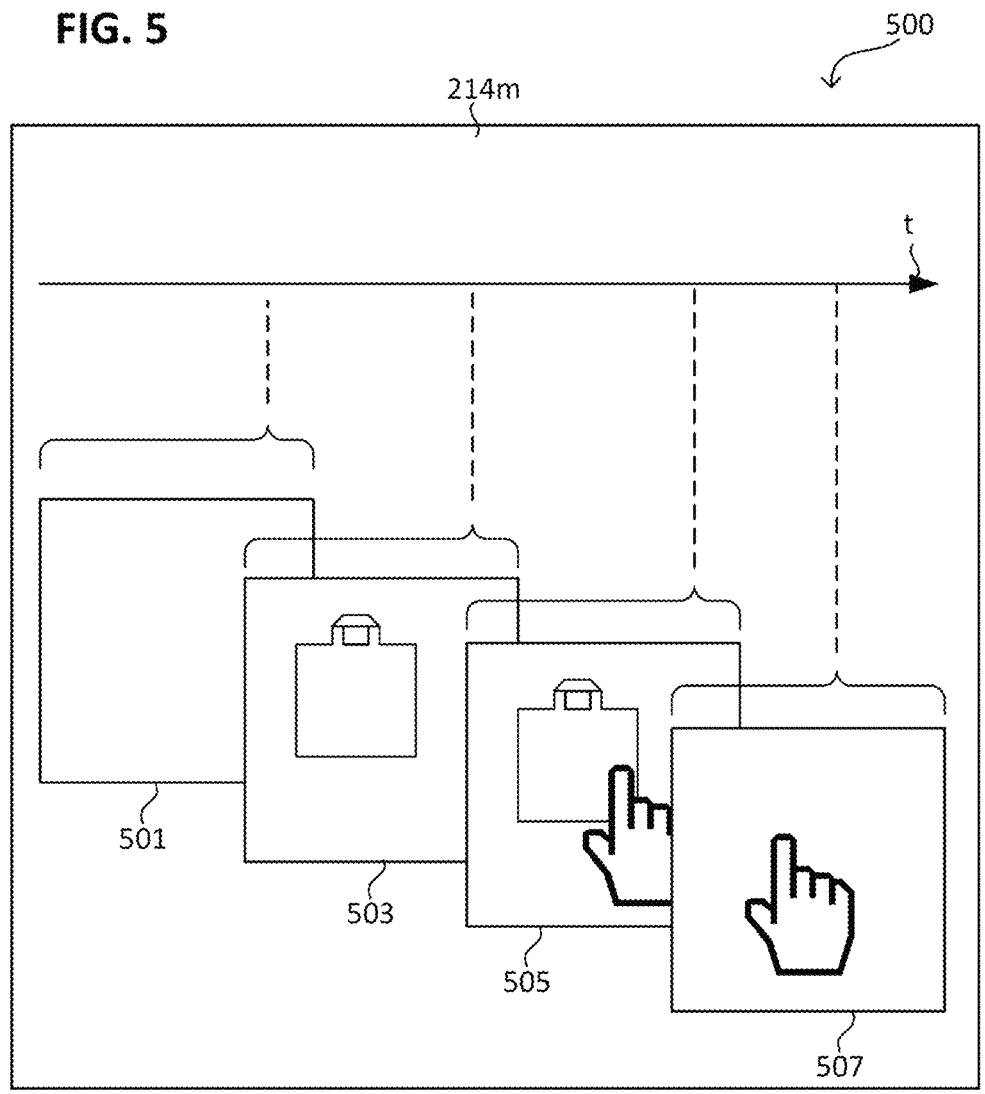
Figure 6:
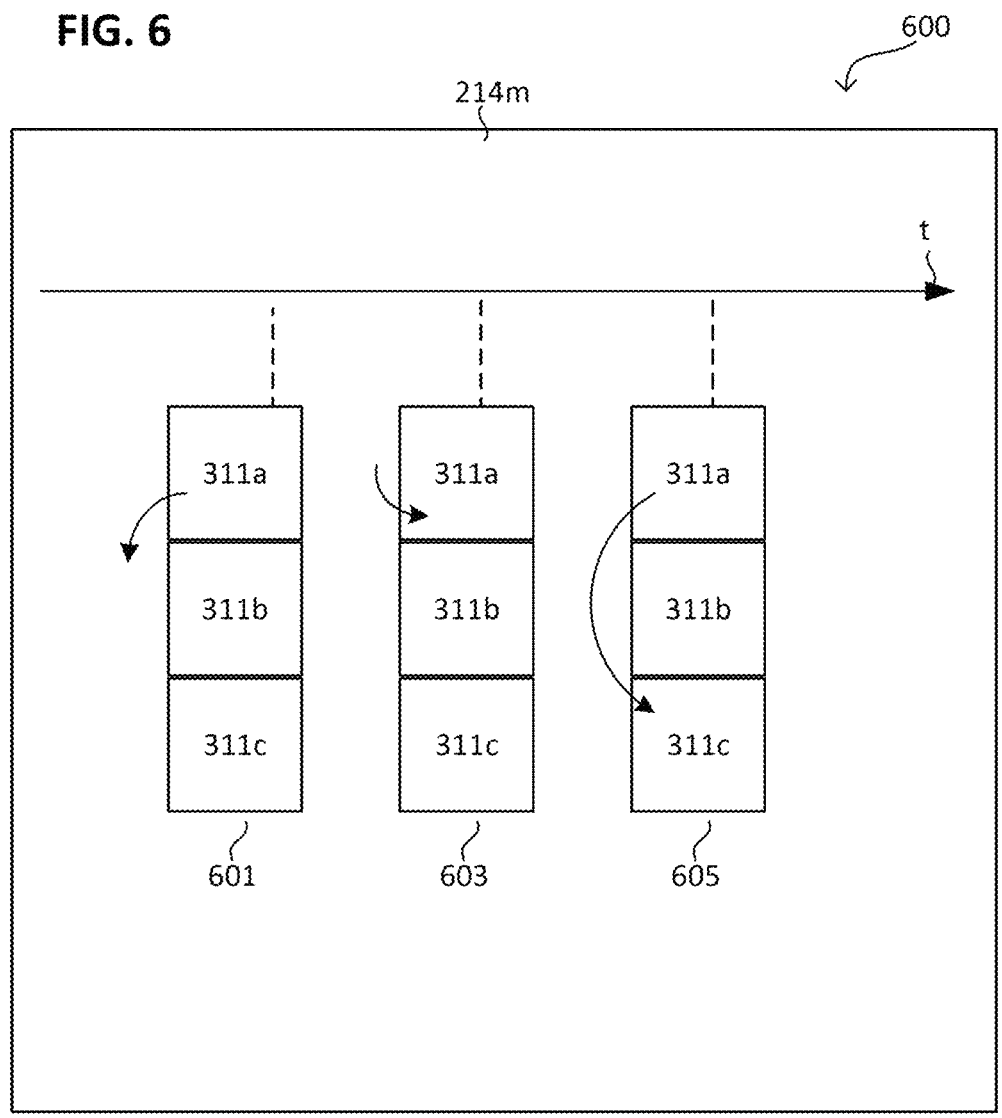
Figure 7:
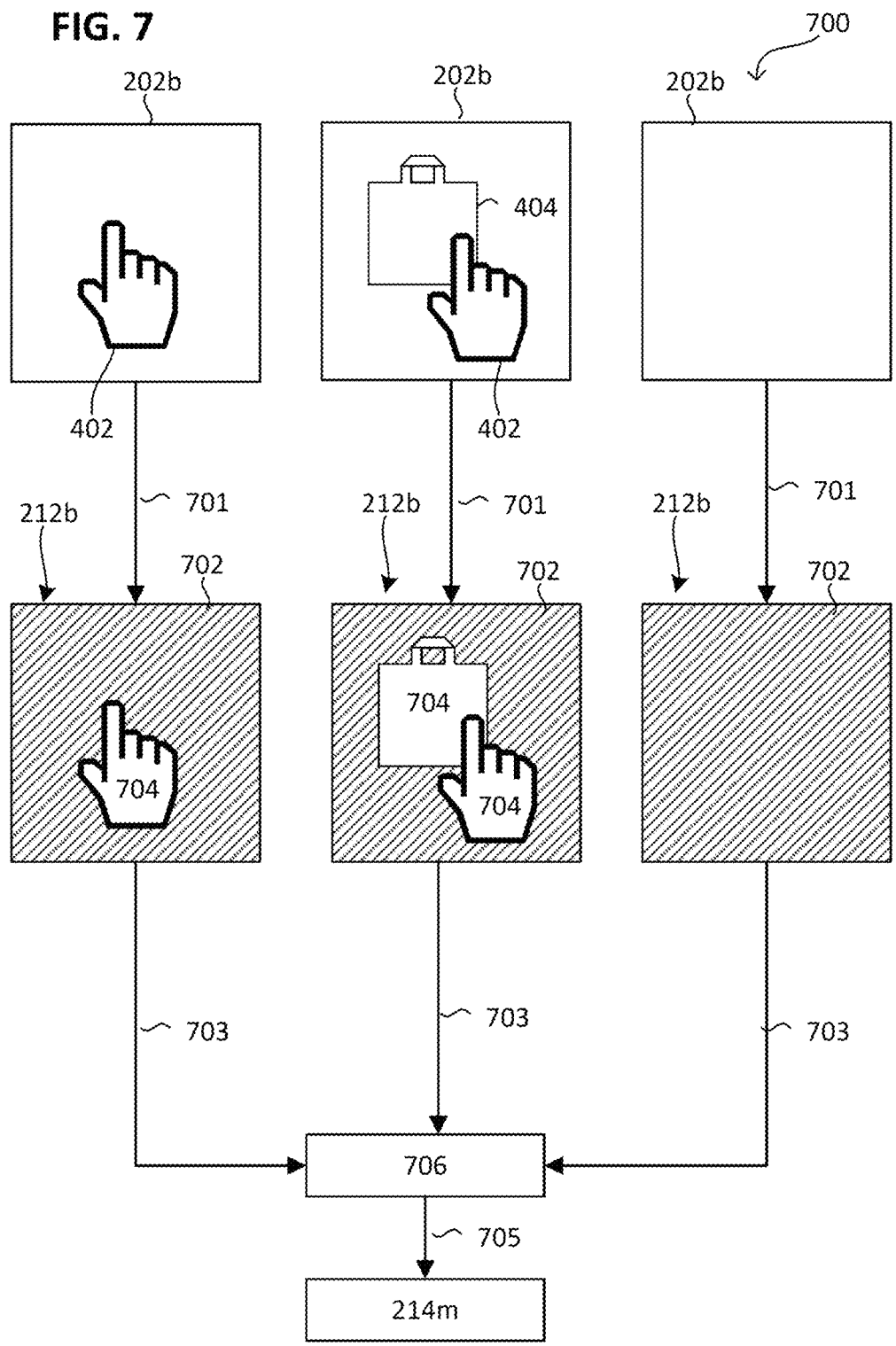
Figure 8:
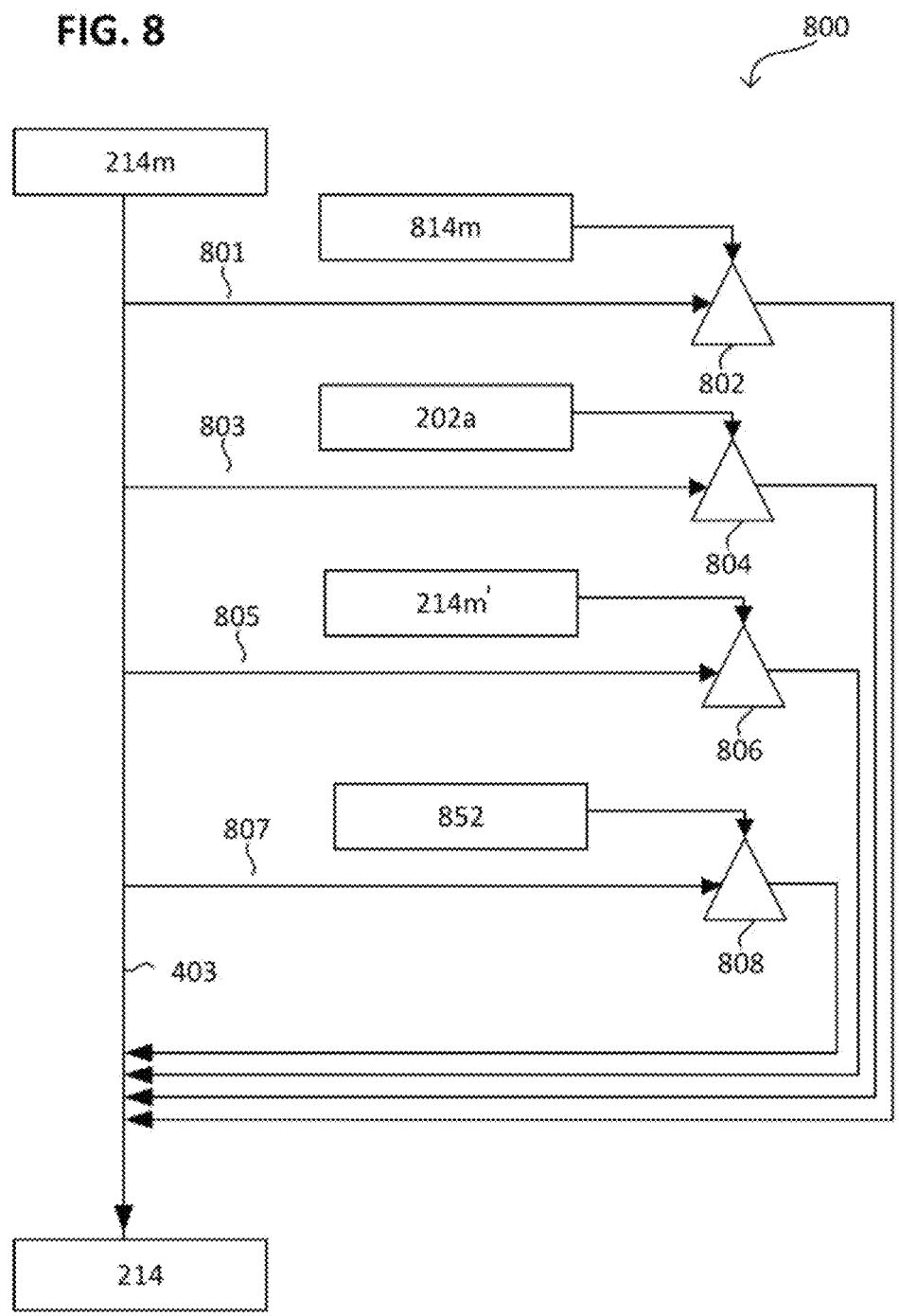
Figure 9:
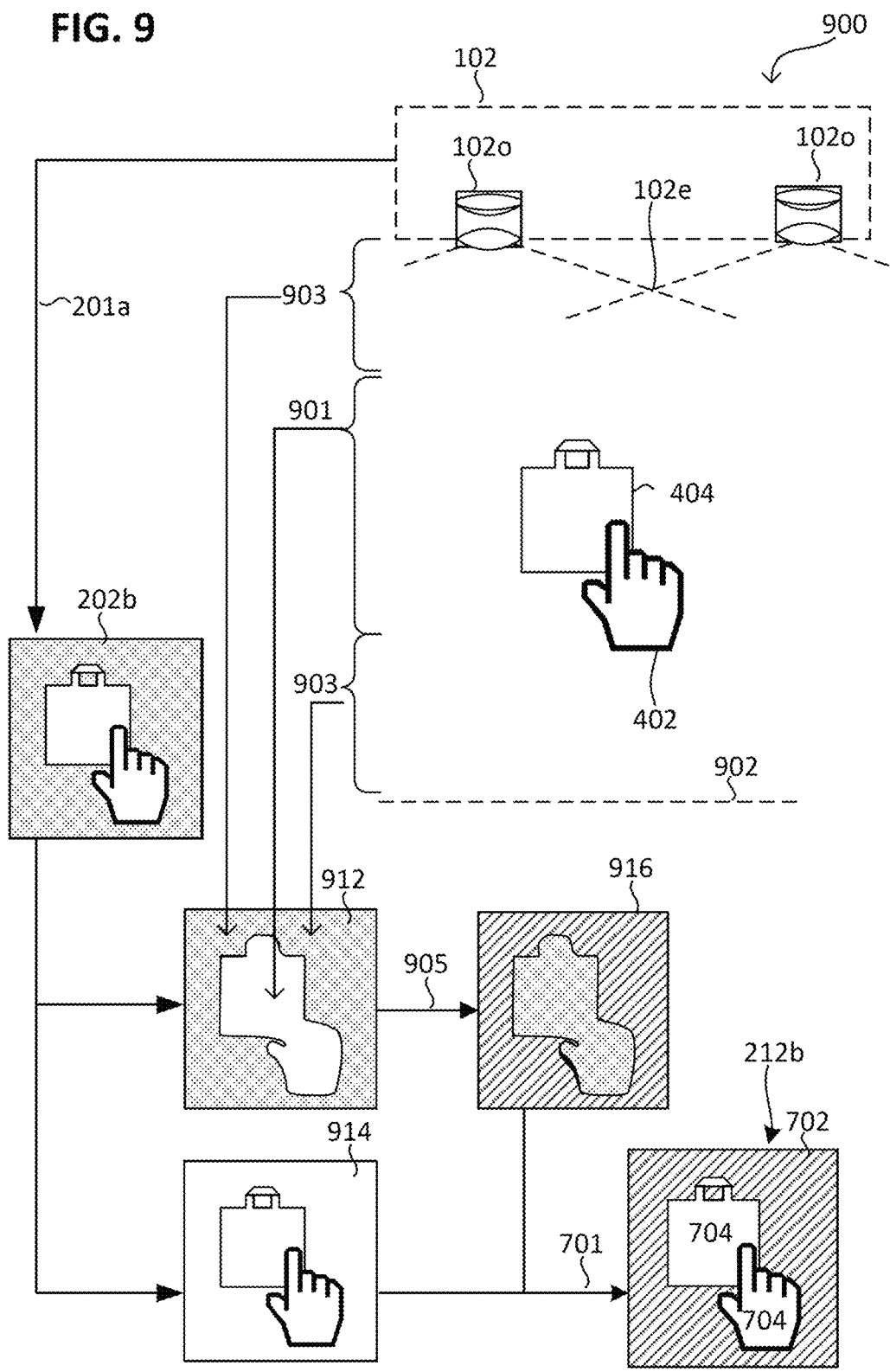
Figure 10:
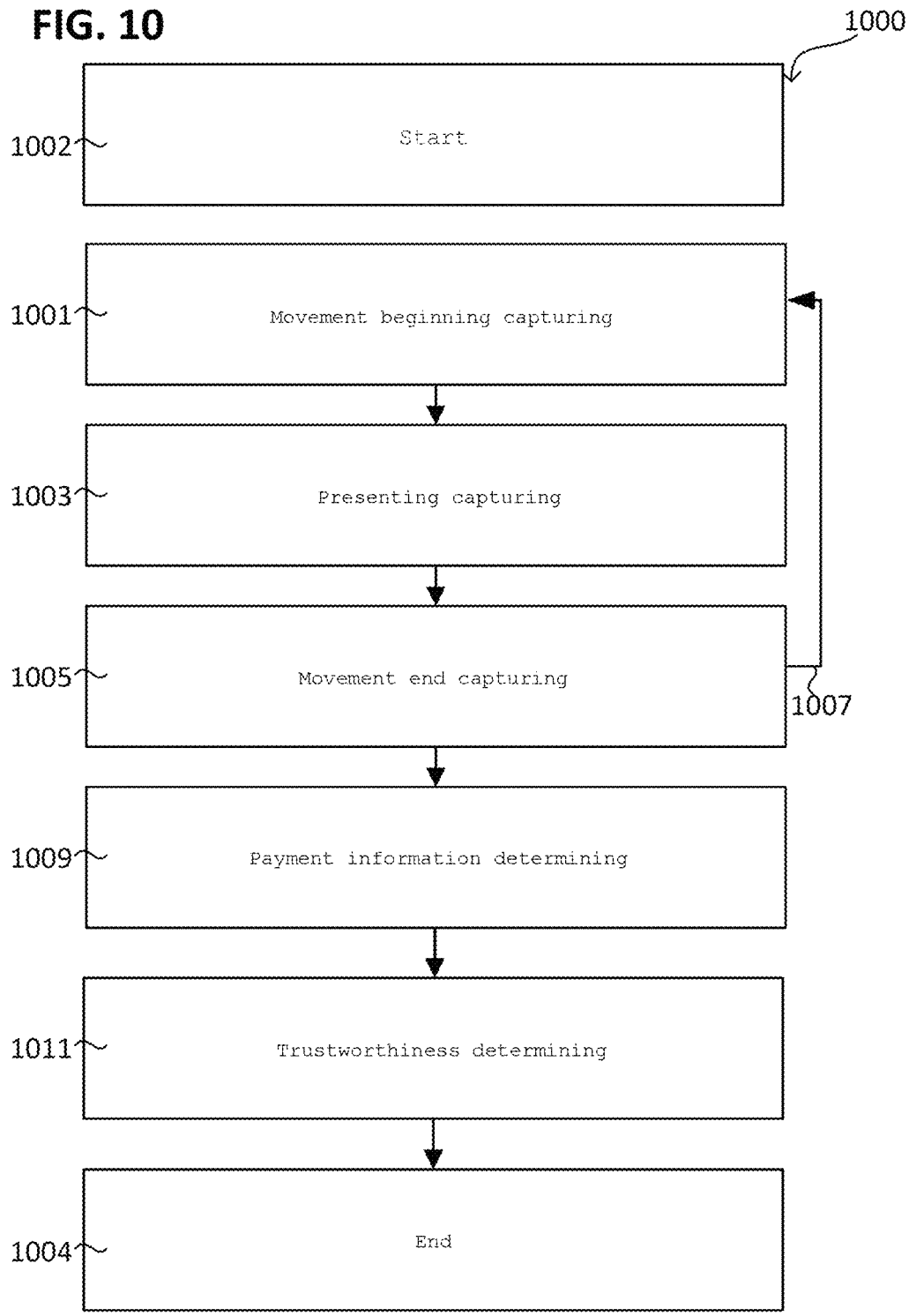
Figure 11:
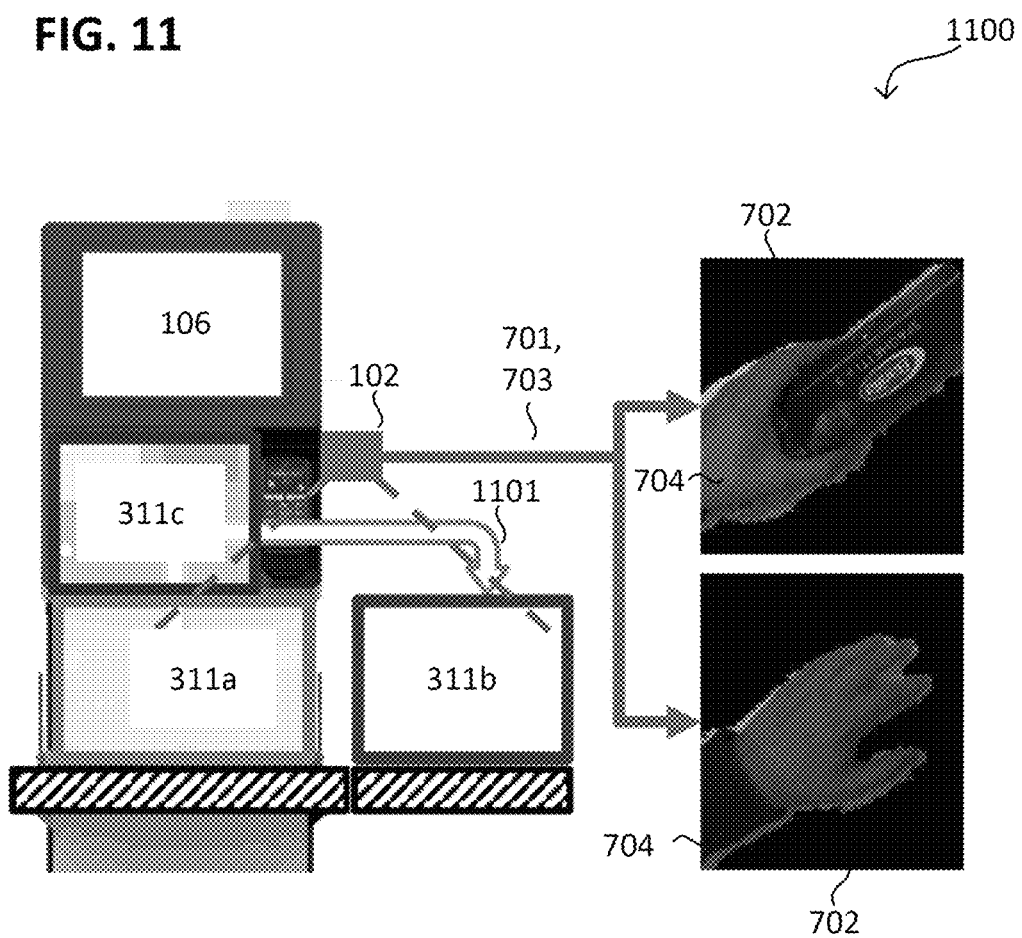
Figure 12:
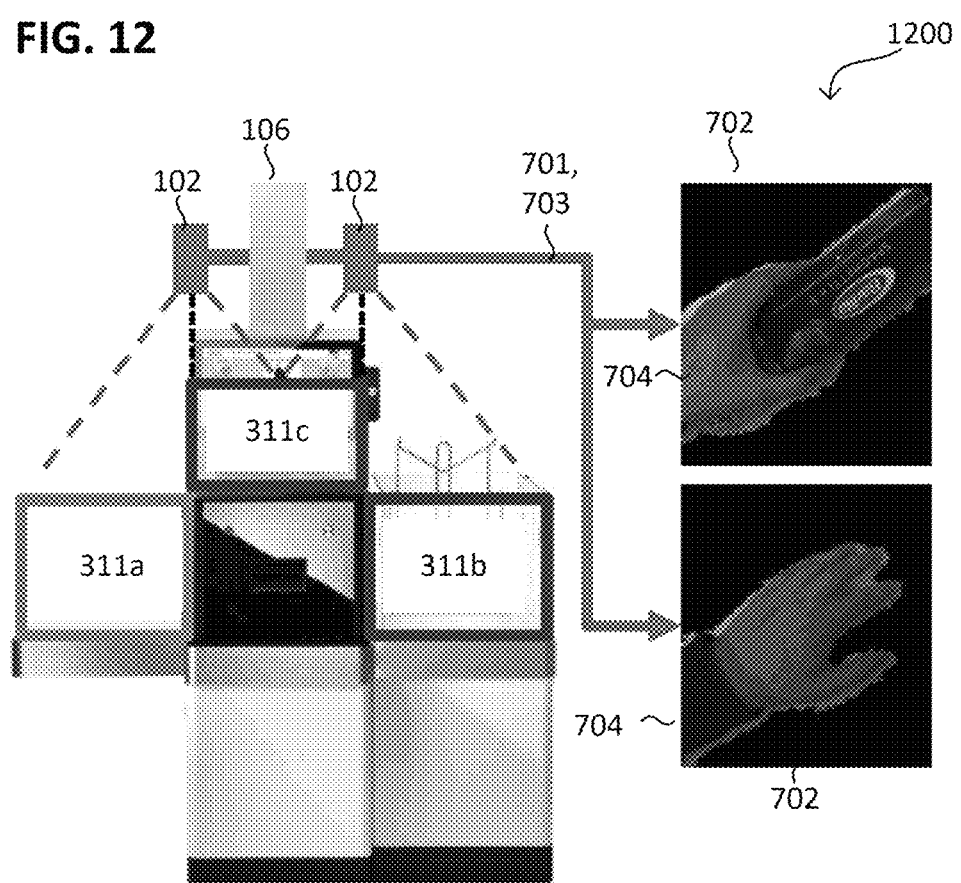
Figure 13:
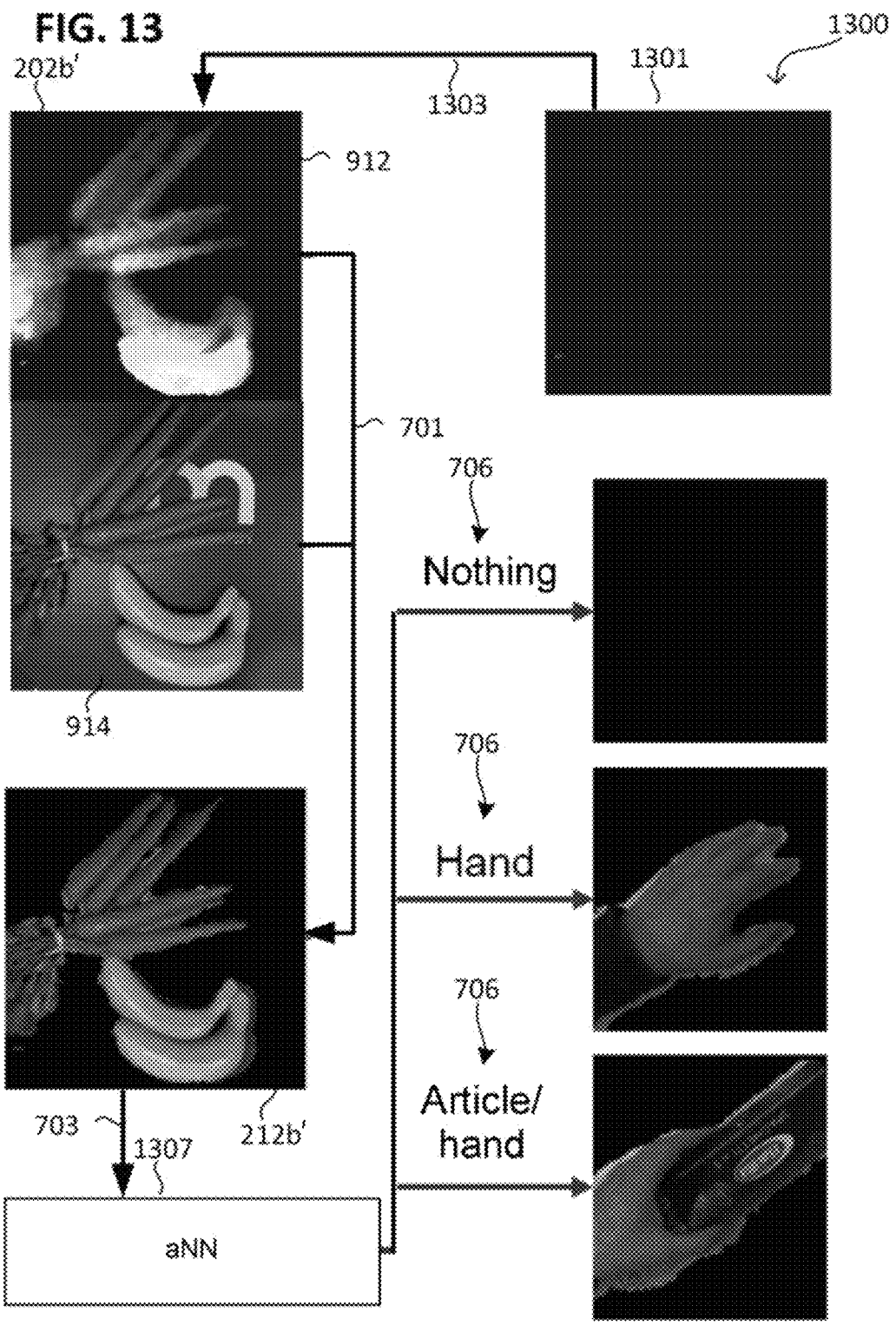
Figure 14:
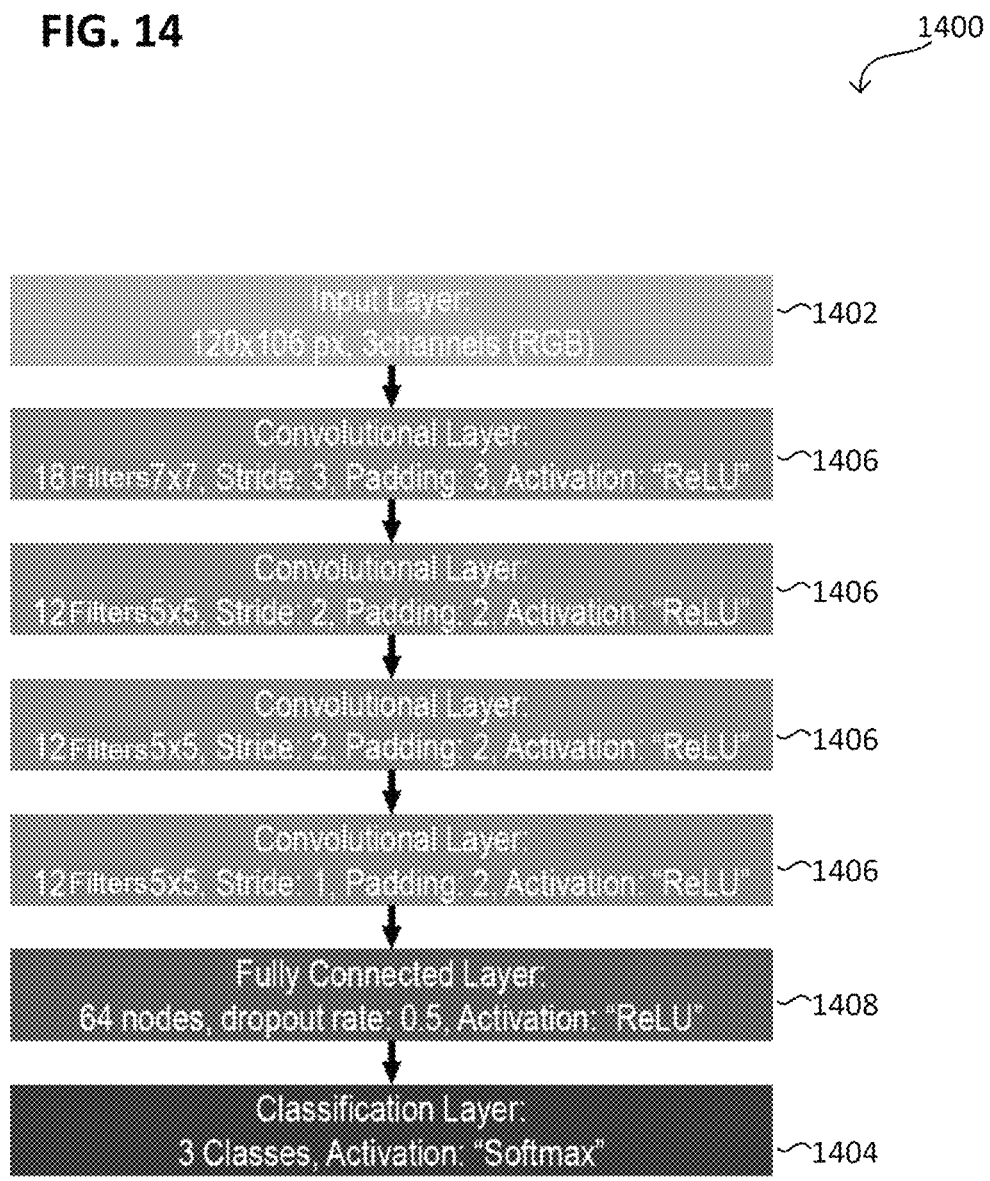

FIGS. 4, 10 and 13 each show a method in accordance with various embodiments in a schematic flow diagram;

FIGS. 5 and 6 each show a movement pattern in accordance with various embodiments in a schematic diagram;

FIG. 7 shows a process of determining a movement pattern in accordance with various embodiments in a schematic flow diagram;

FIG. 8 shows a process of determining an acceptability indication in accordance with various embodiments in a schematic flow diagram;

FIGS. 9, 11 and 12 each show an SS checkout terminal in a method in accordance with various embodiments in a schematic side view; and FIG. 14 shows an artificial neutral network in accordance with various embodiments in a schematic construction diagram.

DETAILED DESCRIPTION

In the following detailed description, reference is made to the accompanying drawings, which form part of this description and show for illustration purposes specific embodiments in which the invention can be implemented. In this regard, direction terminology such as, for instance, "at the top", "at the bottom", "at the front", "at the back", "front", "rear", etc. is used with respect to the orientation of the figure(s) described. Since components of embodiments can be positioned in a number of different orientations, the direction terminology serves for illustration and is not restrictive in any way whatsoever. It goes without saying that other embodiments can be used and structural or logical changes can be made, without departing from the scope of protection of the present invention. It goes without saying that the features of the various exemplary embodiments described here can be combined with one another, unless specifically indicated otherwise. Therefore, the following detailed description should not be interpreted in a restrictive sense, and the scope of protection of the present invention is defined by the appended claims.

In the context of this description, the terms "connected", "attached" and "coupled" are used to describe both a direct and an indirect connection (e.g., resistively and/or electrically conductively, e.g., an electrically conductive connection), a direct or indirect attachment and a direct or indirect coupling. In the figures, identical or similar elements are provided with identical reference signs, insofar as this is expedient.

The term "control device" can be understood as any type of entity which implements logic and which can comprise a circuitry interconnection and/or a processor, for example, which can execute software stored in a storage medium, in firmware or in a combination thereof and can output instructions on the basis thereof. The control device can be configured by means of code segments (e.g., software), for example, in order to control the operation of a system (e.g., the operating point thereof), e.g., of a machine or an apparatus, e.g., the components thereof.

The term "processor" can be understood as any type of entity which allows data or signals to be processed. The data or signals can be handled for example in accordance with at least one (i.e. one or more than one) specific function executed by the processor. A processor can comprise or be formed from an analogue circuit, a digital circuit, a mixed-signal circuit, a logic circuit, a microprocessor, a central processing unit (CPU), a graphics processing unit (GPU), a digital signal processor (DSP), a programmable gate array (FPGA), an integrated circuit or any combination thereof. Any other type of implementation of the respective functions described more thoroughly below can also be understood as a processor or logic circuit. It is understood that one or more of the method steps described in detail herein can be implemented (e.g., realized) by a processor, by means of one or more specific functions executed by the processor. The processor can therefore be configured to carry out one of the methods described herein or the components thereof for information processing.

In accordance with various embodiments, a data memory (more generally also referred to as a storage medium) can be a non-volatile data memory. The data memory can comprise or be formed from a hard disk and/or at least one semiconductor memory (such as e.g., read only memory, random access memory and/or flash memory), for example. The read only memory can be for example an erasable programmable read only memory (can also be referred to as EPROM). The random access memory can be a non-volatile random access memory (can also be referred to as NVRAM). For example, one or more than one of the following can be stored in the data memory: a database (can also be referred to as a reference database), one or more than one reference movement pattern; one or more than one item of reference depth information; one or more than one item of reference color information; code segments which implement one or more than one processing algorithm (also referred to as algorithm for simplification). The database can comprise one or more data sets, each data set of which assigns a product identifier to an item of payment information.

Reference is made herein to an artificial neural network (aNN), inter alia. The description can be analogously applicable if, as an alternative or in addition to the aNN, some other trainable algorithm is used, e.g., a support vector machine or a long short-term memory (also referred to as LSTM). The aNN can comprise a multiplicity of nodes (illustratively artificial neurons) and a connection network (the assignment of connections to nodes). Illustratively, in an aNN, the processes for taking in information and processing information are imitated analogously to biological neurons. This is realized by way of a number of layers of hidden neurons and activation functions that transfer the signals, the number being dependent on the conditions.

The topology of the algorithm describes the structure of the connection network, i.e. how many nodes are distributed among how many layers, and how these are interconnected. By way of example, a plurality of nodes can be arranged in layers situated one behind another, the first layer of which forms the input of the algorithm and the last layer of which forms the output of the algorithm. The last layer, the output of which actually becomes visible outside the connection network, is called the output layer. Layers preceding that are accordingly referred to as hidden layers. Using a graph the artificial neurons can be represented as nodes, and the connections as edges. In this case, by way of example, the algorithm is a directed graph with typed nodes.

After the algorithm has been designed, it is firstly trained (also referred to as the training phase), in which phase the algorithm is adapted to the mode of operation to be trained (illustratively "learns"). For this purpose, the algorithm is supplied with data (the training data), on the basis of which the algorithm learns to imitate the desired mode of operation. In this case, a correct output of the algorithm strengthens what has been learned (i.e., a specific signal path through the connection network), whereas an incorrect output weakens the signal path. In this way, those paths through the connection network which best describe the desired mode of operation gradually develop.

One or more than one of the following processes can take place in the training phase: modifying the connection network (e.g., forming or erasing connections); changing the weighting of nodes; modifying the properties (e.g., threshold values) of the nodes; modifying the number of nodes; modifying activation, propagation and/or output function.

During the training of the algorithm (e.g., the ANN), the training data are selected in accordance with the input parameters respectively desired. In one example, the incoming training data comprise image data of the capture region, from which data the respective target variable (e.g., class or objects to be recognized) is known. The training data can be synchronized and/or related to one another for example by way of time stamps or the origin thereof. It should be pointed out that both the parameters contained in the input vector of the algorithm and the parameters contained in the output vector of the algorithm are highly application-dependent and are selected accordingly.

In accordance with various embodiments, deviations between movement patterns (also referred to as pattern deviations) are determined. The pattern deviations are caused for example by atypical movements in the capture region, that is to say that they arise or become larger if the movement does not conform to expectations. By way of example, a sequence of image data (illustratively a plurality of image data acquired in succession) of the capture region to be examined (or of only one zone thereof) can be used to determine the movement pattern. Changes between the image data of the sequence are caused by the movement of objects in the capture region to be examined (or only one zone thereof), which movement is descried by the movement pattern. The movement pattern determined can be compared with one or more than one reference movement pattern (which was/were extracted for example from a reference check out process, for example in a preceding training method) and a decision as to whether or not the movement pattern determined is suspicious is taken on the basis of the pattern deviations. It is also possible, of course, to determine gradations between the result "suspicious" or "not suspicious" (also referred to as degree of suspiciousness). Suspiciousness can be understood herein as the inverse of trustworthiness.

In accordance with various embodiments, the one or more than one reference movement pattern (also referred to as reference pattern for simplification) can be stored, e.g., on a storage medium and/or in a database. The one or more than one reference pattern can comprise a plurality of reference patterns (e.g., two or more than two, e.g., three, four, five, six, seven, eight, nine, ten or more than ten, e.g., twenty, fifty, e.g., one hundred or more than one hundred).

In accordance with various embodiments, depth information is obtained by means of three-dimensional 3D image capture. The depth information can be used for example to recognize whether an object is situated in the capture region (or the zones thereof, e.g., above a reference plane. It is thus possible to distinguish in which zone of the capture region an object is situated. By way of example, it is possible to obtain the depth information through the entire capture region, such that illustratively from above it is possible to recognize the spatial position of one or more than one object relative to the reference plane.

In accordance with various embodiments, the image capture device can provide image data of the capture region from a plurality of optical perspectives (e.g., provided by means of a plurality of lenses) which represent depth information of the capture region (e.g., stereoscopically). In order to determine the depth information, the image data captured from different perspectives (e.g., by means of a plurality of lenses) can be superimposed on one another, e.g., taking account of a relative spatial pose (position and/or orientation) of the lenses with respect to one another. A camera can comprise an (optical) image capture sensor and at least one lens (also referred to as lens arrangement) assigned to the image capture sensor. The lens arrangement of a plenoptic camera can also comprise a grid of a plurality of microlenses. By way of example, the image capture device (e.g., RealSense F200, INTEL R200 and/or Intel SR300) can comprise an RGB image capture sensor and/or a 3D image capture sensor.

An image capture sensor (also referred to as an image sensor or an optical sensor) can comprise one or more photoelectrically active regions (can also be referred to as pixels) which generate and/or modify an electrical signal e.g., in response to electromagnetic radiation (e.g., light, e.g., visible light). The image capture sensor can comprise or be formed from a CCD sensor (charge-coupled device sensor) and/or an active pixel sensor (can also be referred to as CMOS sensor), for example. Optionally, an image capture sensor can be configured in a wavelength-sensitive fashion (e.g., for capturing color information), e.g., by means of a plurality of color filters (e.g., in grid form).

In accordance with various embodiments, an SS checkout terminal can be configured to register the products that a customer wants to purchase, e.g., by means of scanning the products on a scanner (e.g., a barcode scanner). Furthermore, the SS checkout terminal can comprise a (e.g., digital) cash register system (then also referred to as self-service cash register) configured to carry out a payment process. The payment process can comprise for example the customer also paying for the products to be purchased. The cash register system can comprise at least one of the following: a screen (e.g., a touch-sensitive screen), a printer (e.g., for printing out an invoice and/or a label), a (e.g., programmable) cash register keyboard (can also be part of the touch-sensitive screen), a payment means terminal for accepting a payment means (e.g., cash or a debit card). The payment means terminal can be for example an electronic payment means terminal (can also be referred to as EC terminal, "EC"-electronic cash, e.g., for reading a debit card and/or a credit card). The cash register system and the scanner can be arranged on the same side (e.g., of a pole) of the SS checkout terminal, such that they can be operated from one position.

Reference is made hereinafter to products (e.g., goods, can also be referred to as articles) as objects. The description can analogously also apply to other objects, such as a hand, for example.

Reference is made hereinafter to image data and the processing thereof. The image data can be a digital image representation of reality (e.g., of the capture region) at a point in time of capturing the image data. The imaging of reality can be effected by means of a lens, for example, which projects light onto the surface of an image capture sensor (e.g., a Bayer sensor). Capturing the image data can comprise reading the image capture sensor while the light is projected onto the surface thereof. The image data thus obtained can initially be in the so-called raw data format (also referred to as RAW), which comprises pixel by pixel the measured values read out from the image capture sensor and/or is processed as such. The image data can optionally be or have been converted into a different image format during processing, e.g., into raster graphics (different than RAW as raster graphics) or vector graphics (such that their further processing takes place in this image format, or they can be converted arbitrarily between these. The converting can optionally comprise interpolating the measured values from the image capture senor (e.g., by means of demosaicing), e.g., in order to obtain complete multicolored color information for each pixel or in order to require less memory space or computing power. The image data can optionally be compressed (e.g., in order to require less memory space or computing power) or uncompressed (e.g., in order to avoid corruption). The respective image format can also define the color space according to which the color information is specified.

The simplest case is a binary color space, in which one black-and-white value is stored per pixel. In the case of a somewhat more complex color space (also referred to as grayscale color space), intermediate levels between black and white are stored (also referred to as grayscale values). However, the color space can also be spanned by a plurality of (e.g., two or more) primary colors, such as red, green and blue, for example. If the measured values are intended to comprise multicolored color information, for example, a wavelength-sensitive image capture sensor can be used. The measured values thereof can be coded in accordance with a color space, for example. The color information or the underlying color space can therefore be multicolored (also referred to as photochromatic) or else single colored (also referred to as monochromatic). The monochromatic color information can for example comprise only grayscale values (then also referred to as grayscale value information) or comprise black-and-white values (then also referred to as black-and-white value information). For visual rendering of the image data on a display device, said image data are converted into that image format which is predefined by the image memory of the graphics card. For ease of understanding, the image data described herein are represented as such visual rendering. In general, the image data, e.g., stored in a storage medium, can be present as a file (also referred to as a digital image or image file) in the respective image format.

The image data can optionally comprise (e.g., as an alternative or in addition to the color information) depth information (also referred to as 3D information). A so-called 3D camera can be used for capturing the depth information, as will be described in even greater detail later. The measured values of the 3D camera can comprise (e.g., pixel by pixel) information concerning a topography of the imaged reality (also referred to as depth information). By way of example, the depth information can specify the distance between a or each pixel of the camera and a location in space that is imaged onto the pixel.

The depth information can be quantified, e.g., with indication of the depth as value, can be coded or can be indirectly part of the image data, e.g., if the image data comprise a plurality of simultaneously captured perspectives of the capture space (e.g., separately from one another or superimposed on one another). The plurality of simultaneously captured perspectives can be superimposed on one another, for example, in order to quantify the depth information. The value of the depth information can then correspond for example to a deviation between the plurality of simultaneously captured perspectives.

By means of a 3D-based segmentation of the image data and classification by means of an ANN, it is possible to detect very efficiently the appearance of hands and/or other objects in a plurality of (e.g., three) zones of the capture region. In this regard, firstly the case of fraud can be detected, and secondly the overall process can be analyzed for deviations from normal behavior. Thus, the entire checkout process (also referred to as checkout procedure) can be assessed in respect of its suspiciousness and optionally an employee can be informed.

Furthermore, acquiring temporal behaviors at many self-service cash registers enables more extensive analysis and optimization of the process (and of the cash registers). In this case, the position of the camera can be configured in such a way that, rather than the customer actually being monitored, only the temporal behavior of the customer's article movements is monitored. Moreover, image data need not be permanently stored at any point in time (except if desired), rather they can be used just for analysis in the volatile memory.

On account of the preprocessing of the image data by means of a depth-based segmentation and also a targeted optimization of the architecture of the aNN to the given problem formulation, very high recognition rates can be achieved in comparison with conventional mechanisms. Alternatively or additionally, on account of the preprocessing of the image data by means of a depth-base segmentation and also a targeted optimization of the architecture of the aNN to the given problem formulated, more cost-effective hardware can be made possible in comparison with conventional mechanisms. Illustratively, less computing power is necessary to achieve high recognition rates.

In accordance with various embodiments, it has been recognized that a color- or brightness-based image segmentation algorithm can lead to good results only in a controlled and invariant environment of an SS checkout terminal. However, if the lighting conditions vary and/or reflective surfaces are present, these lead to unusable results of the image segmentation algorithm. Learning the background by means of a classifier is likewise realizable exclusively in a controlled and invariant environment, and so such mechanisms by themselves in practice lead to high error rates that are unacceptable in a sensitive application such as detecting fraud.

In accordance with various embodiments, therefore, the image data are subjected to a targeted classification in respect of hands that move products into or through defined zones. This affords distinctly lower error rates in comparison with direct article recognition. Furthermore, the algorithms are independent of the appearance of the products and environmental influences.

In accordance with various embodiments, use is made of a 3D and color image camera for robust image segmentation as preprocessing of the image data and an image classification (also referred to as classifying) downstream of this preprocessing takes place.

Optionally, as an alternative or in addition to preventing fraud attempts, the checkout process can be used to analyze the scanning behavior, for example with regard to speed and/or efficiency, in order to optimize systems of this type in regard to handling and ergonomics.

Figure 1:
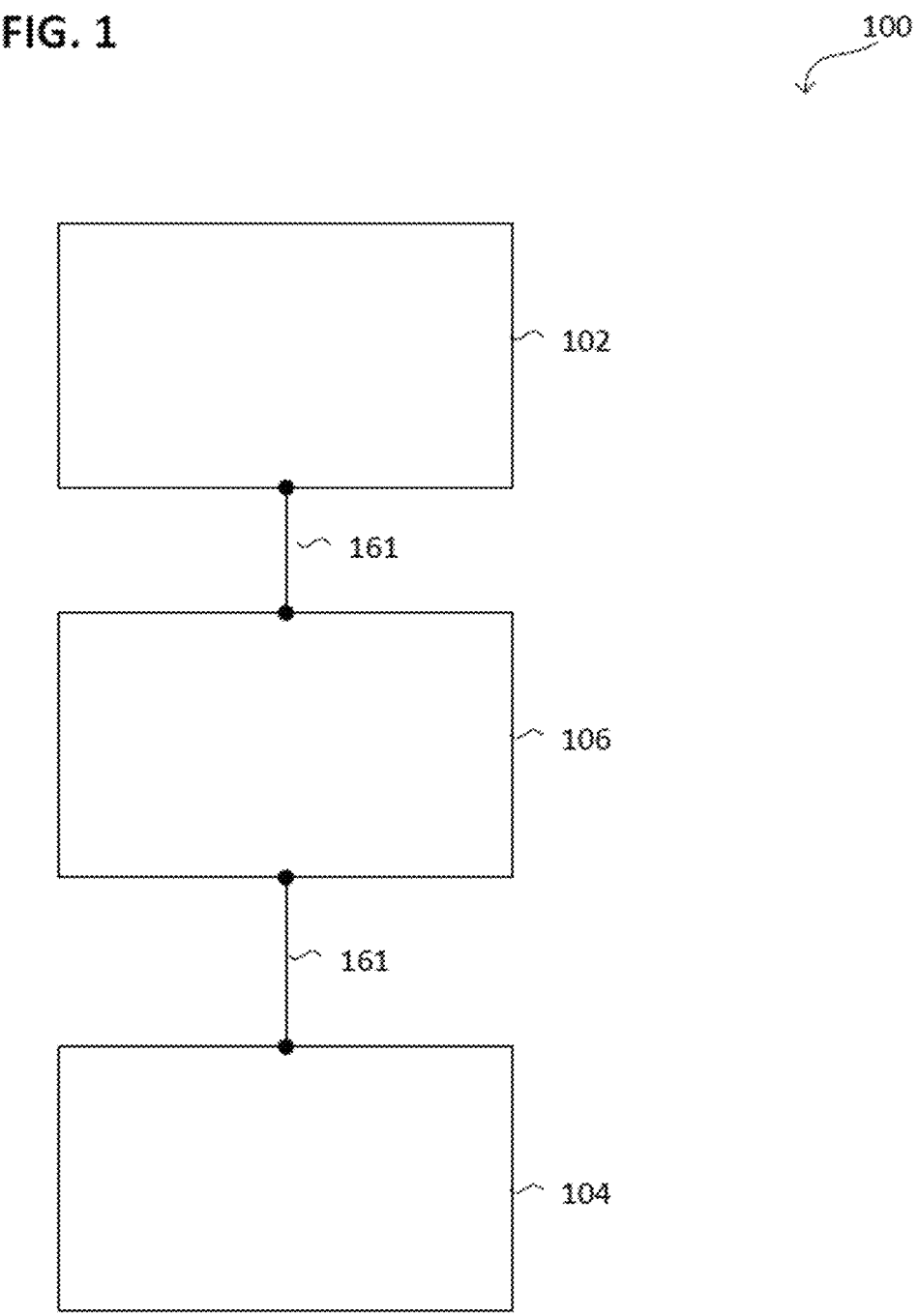
FIG. 1 shows an SS checkout terminal in accordance with various embodiments in a schematic construction diagram.

FIG. 1 illustrates an SS checkout terminal 100 in accordance with various embodiments in a schematic construction diagram. The SS checkout terminal 100 can comprise an image capture device 102, a product capture device 104 and a control device 106. The control device 106 can be communicatively coupled to the image capture device 102 and the product capture device 104, e.g., by means of a field bus communication network 161.

The image capture device 102 can be configured to supply the control device 106 with image data of a capture region (e.g., in the raw data format or a preprocessed version of the raw data format), e.g., pixel-based image data (also referred to as raster graphics). The image capture device 102 can comprise one or more than one camera, for example, as will be described in even more specific detail later.

The product capture device 104 can be configured to supply the control device 106 with a product identifier that it has captured. The product identifier can be uniquely assigned to a product or the type thereof, for example. The product identifier can be determined for example on the basis of an optical feature (also referred to as identifier feature) of the product which is captured. The identifier feature (e.g., a pattern) can comprise a visual code representing the product identifier, e.g., a binary code or the like. By way of example, the identifier feature can comprise a barcode or some other machine-readable code.

By means of the product capture device 104, it is possible to effect product by product determining of the individual product identifiers (also referred to as identifier capturing). The region in which the product capture device 104 can capture the product can be for example a partial region of the capture region (also referred to as product capture zone). The identifier capturing can comprise presenting a product to be captured to the product capture device 104. The presenting can comprise arranging the product to be captured in the product capture zone and orienting the identifier feature of said product in the direction of the product capture device 104.

By way of example, the product capture device 104 can comprise an optical capture device, an RFID scanning device (radio frequency identification) or the like. The optical capture device can comprise for example a barcode scanning device or an image scanning device. The barcode scanning device can include corresponding sensors for implementing a scanning functionality, such as, for example, one or more than one infrared sensor, one or more than one camera and the like. The product capture device 104 can be configured for example to capture the machine-readable code and to be able to process it in order to extract the product identifier therefrom.

The product capture device 104 and the image capture device 102 can comprise a corresponding infrastructure (e.g., comprising processor, storage medium and/or bus system) or the like, which implements a measuring chain. The measuring chain can be configured to drive the corresponding sensors (e.g., camera, scanner, etc.), to process the measurement variable thereof as input variable and, on the basis thereof, to provide the image data or product identifier as output variable.

The product capture device 104, the image capture device 102 and the control device 106 need not necessarily comprise dedicated infrastructures. By way of example, their information processing functions can also be provided as components of the same software (also referred to as application) which is executed by one or more than one processor of the SS checkout terminal 100. It is also possible, of course, to use a plurality of applications and/or a plurality of processors which provide the information processing functions of the product capture device 104, of the image capture device 102 and of the control device 106.

Figure 2:
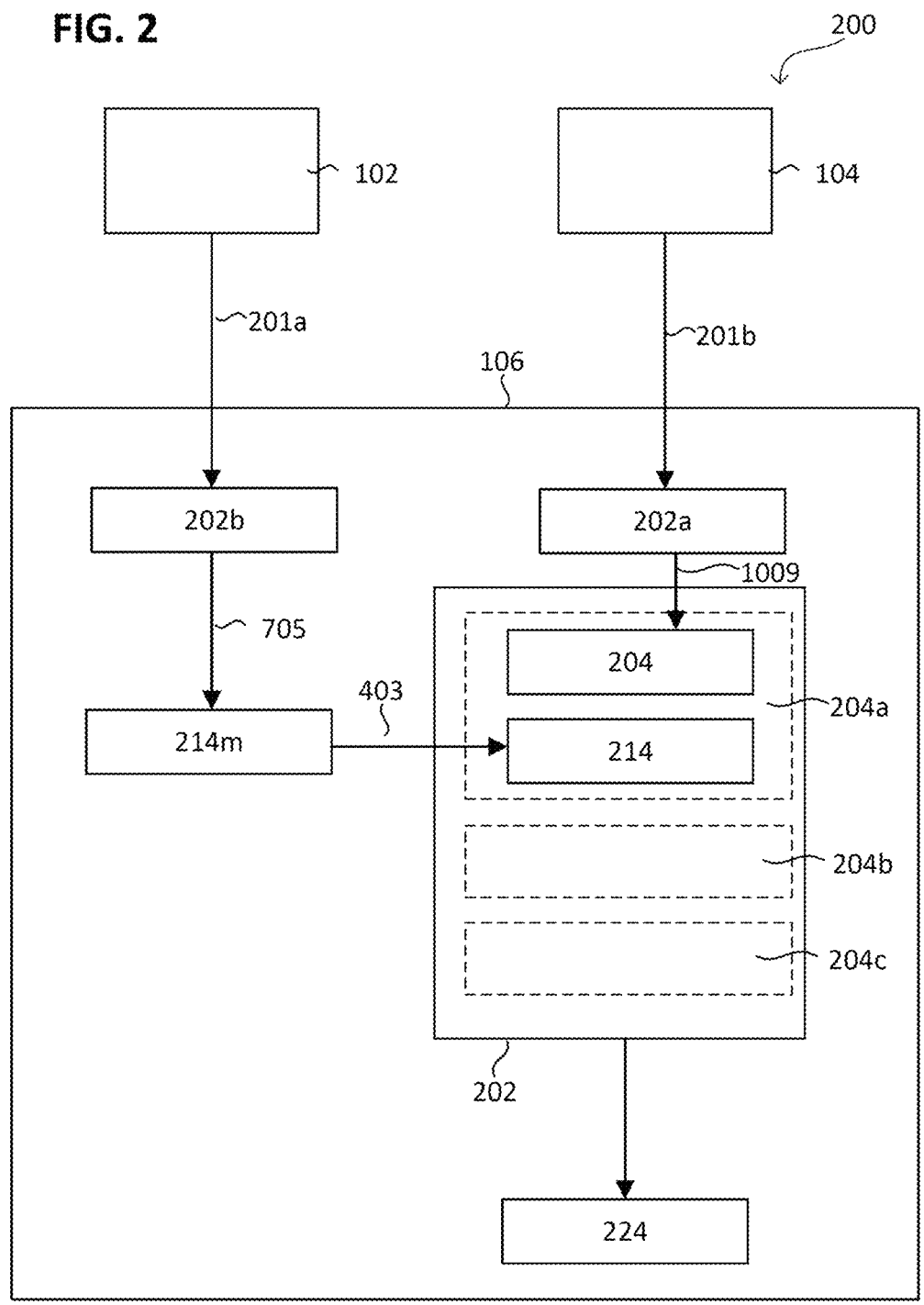
FIG. 2 shows an SS checkout terminal in accordance with various embodiments in a schematic communication diagram.

FIG. 2 illustrates an SS checkout terminal 200 in accordance with various embodiments in a schematic communication diagram, e.g., configured like the SS checkout terminal 100.

The image capture device 102 can be configured to supply 201a the control device 106 with the image data 202b of the capture region (e.g., in the raw data format or a preprocessed version of the raw data form), e.g., continuously as a sequence. The product capture device 104 can be configured to supply 201b the control device 106 with a captured product identifier 202a.

The control device 106 can be configured for determining 1009 payment information 204 on the basis of the product identifier 202a (also referred to as payment information determining). The payment information 204 can illustratively represent what price is invoked for the corresponding product with the products identifier 202a. By way of example, the captured product identifier 202a can be compared with a database for this purpose.

By way of example, the control device 106 can be configured to start a checkout session 202, e.g., in response to a determined event (also referred to as session start event) which represents that a self-service checkout is intended to be effected. Examples of the session start event can comprise a user standing in front of the SS checkout terminal 200 and/or performing a corresponding input on the latter, a product having been presented to the product capture device 104, and/or a previous checkout session having ended.

In a similar manner, the control device 106 can be configured to end the checkout session 202, e.g., in response to a determined event (also referred to as session end event) which represents that billing of the self-service checkout is intended to be effected. Examples of the session end event can comprise a user performing a corresponding input on the SS checkout terminal 200. Examples of the session end event can comprise a bank card or some other payment means having been detected by the SS checkout terminal 100, and/or a predefined time period having elapsed since the last product was captured.

For the purpose of ending the checkout session 202, the control device 106 can be configured to determine billing information 224 and to display it by means of a display device of the SS checkout terminal 200. The payment information 204 determined during a checkout session 202 can be aggregated, for example, and the result of the aggregating can be added to the billing information 224. The billing information 224 can illustratively indicate what total to be paid is produced by the registered products. The billing information 224 can optionally comprise further information, such as, for example, the proportion of taxes, a list of the products captured, an itemized list of the products captured, or the like.

The control device 106 can be configured to determine a movement pattern 214m on the basis of the image data 202b. the movement pattern 214m can represent a movement of an object (e.g., of a product and/or of a hand) in the capture region, as will be described in even more specific detail later. The control device 106 can furthermore be configured to determine 403 an indication 214 about a trustworthiness (also referred to as acceptability indication 214) of the payment information 204 on the basis of the movement pattern 214m, as will be described in even more specific detail later.

In an implementation with low complexity, the acceptability indication 214 can comprise a quantified or quantifiable parameter, e.g., can comprise a value from a value interval, wherein the lower end of the value interval represents a low trustworthiness and the upper end of the value interval represents a high trustworthiness, or vice versa. Alternatively or additionally, the acceptability indication 214 as a parameter can comprise one class (also referred to as suspiciousness level) selected from a plurality of classes (also referred to as unacceptability classes). The plurality of unacceptability classes can comprise for example a first class "acceptable", a second class "unacceptable" and optionally additional classes, such as, for example, gradations therebetween. It goes without saying that other types of parameters can also be used. It goes without saying that the type of parameter respectively used can be or have been specifically adapted to the respective application. Optionally, the acceptability indication 214 can comprise additional parameters, such as, for example, information about a reliability or about a possible measurement error. A plurality of parameters of the acceptability indication 214 can be processed for example as components of a vector. More generally, the parameters of the acceptability indication 214 can be processed as an arbitrarily formulated parameter set.

Each acceptability indication 214 can be assigned for example to (e.g., exactly one item of) payment information 204 of a product, such that pairs 204a, 204b, 204c constituting payment information 204 of a product and acceptability indication assigned thereto are formed. It is thus possible to provide for example a product by product resolved indication about the trustworthiness. By way of example, it is possible to determine the respective products whose acceptability indications satisfy a criterion, the criterion representing that the trustworthiness is acceptable. This makes it possible for example to take it into account if products differ from one another in terms of the required trustworthiness and/or to weight same. In this case, it is possible to use for example criteria that are respectively individually assigned to the products. By way of example, it is possible to determine a statistical variable on the basis of the acceptability indications 214, e.g., a mean value, a fluctuation or a number of acceptability indications 214 which satisfy the criterion. The statistical variable makes it possible to obtain for example further information regarding the acceptability of the entire checkout session 202. By way of example, the acceptability indications 214 can be weighted on the basis of the respectively assigned product or the type thereof.

However, the acceptability indications 214 need not necessarily be assigned and/or stored product by product. A plurality of acceptability indications 214 of a checkout session 202 can for example also be combined (e.g., summed) in an unordered manner. The result of the combining makes it possible for example to obtain further information regarding the acceptability of the entire checkout session 202. Optionally, the acceptability indications 214 can be weighted here as well.

It goes without saying that it is also possible to determine a single acceptability indication 214 representing the entire checkout session 202, e.g., on the basis of a multiplicity of movement patterns which were determined during the checkout session 202.

It goes without saying that acceptability indications 214 can also be determined in the manner of random sampling.

Figure 3:
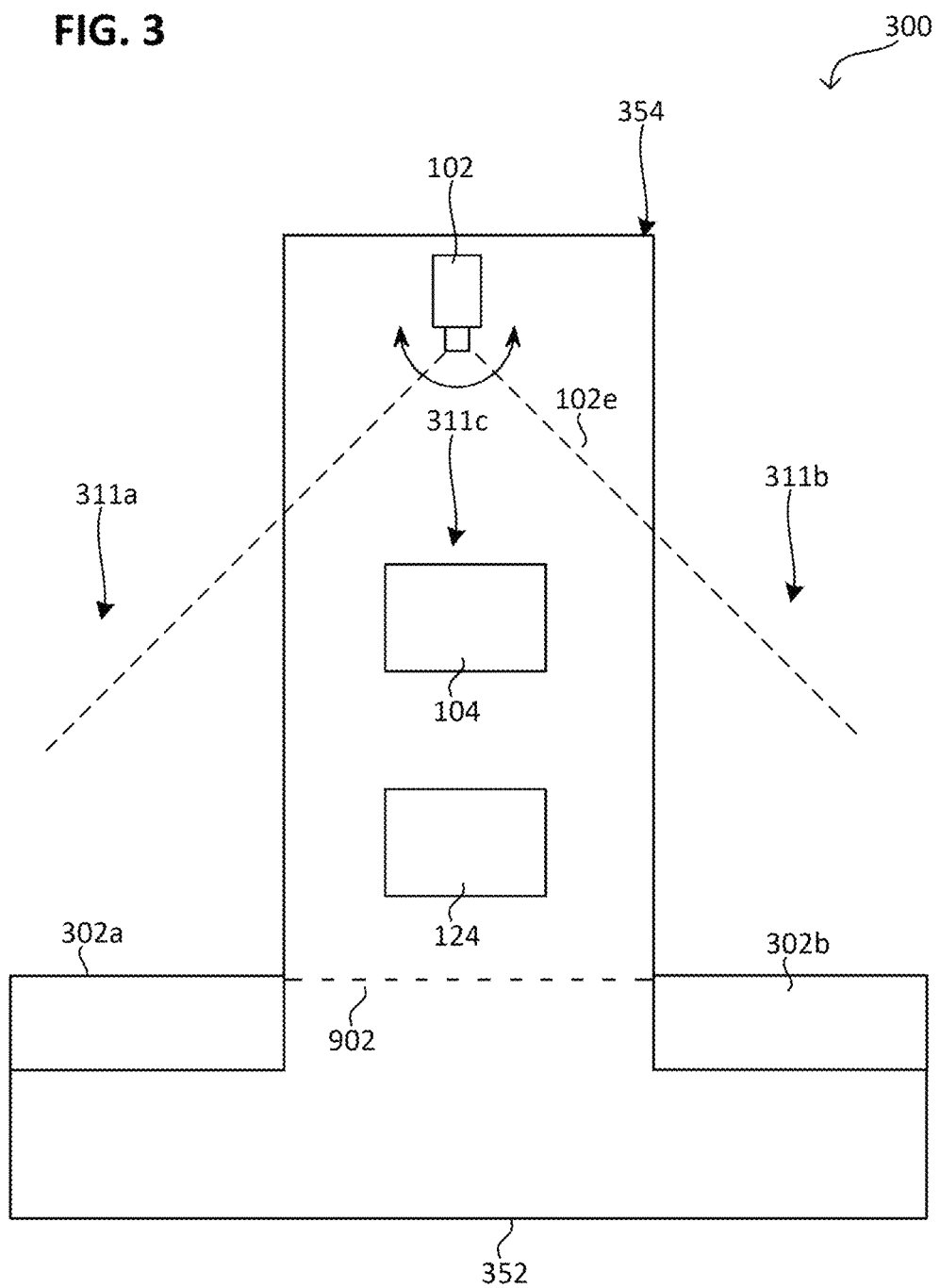
FIG. 3 shows an SS checkout terminal in accordance with various embodiments in a schematic side view.

FIG. 3 illustrates an SS checkout terminal 300 in accordance with various embodiments in a schematic side view, e.g., configured like the SS checkout terminal 100 or 200.

In general, the SS checkout terminal 300 can comprise a supporting structure 352, which supports various components of the SS checkout terminal 300, for example one or more than one placement devices 302a, 302b, the image capture device 102, the product capture device 104, the control device (not illustrated), etc. The supporting structure 352 can comprise for example a framework and a housing secured thereto, wherein the housing houses the sensitive components of the SS checkout terminal 300. The supporting structure 352 can comprise for example a base, by which the supporting structure 352 stands on a surface underneath, and a vertically extended section 354 (illustratively also referred to as pole), which supports the components attached in an elevated fashion, e.g., the image capture device 102 and the product capture device 104.

The image capture device 102 can be configured to capture image data of the capture region 102e. For this purpose, the image capture device 102 can comprise one or more than one camera. By way of example, the image capture device 102 can be configured to generate image data comprising depth information of the capture region 102e.

For determining the depth information, the image capture device 102 can comprise for example one or more than one 3D camera (also referred to as 3-dimensional camera). A 3D camera can generally be configured to capture image data comprising the depth information.

Examples of a 3D camera comprise: a plenoptic camera (also referred to as a light field camera), a stereoscopic camera (also referred to for short as stereo camera), a camera with a triangulation system, a TOF camera (time of flight camera), a camera with an interference system. In this case, a stereo camera is a particularly cost-effective 3D camera that is easier to implement. A stereo camera is likewise more robust vis-à-vis reflective surfaces and does not require a laser, which reduces the health risk for persons in public spaces.

The TOF camera can be configured for example to illuminate the capture region 102e by means of a light pulse and to capture for each pixel a time (the so-called time of flight) needed by the light pulse to return again. In general, however, a signal of a different type (e.g., sound) can also be used in order to measure a spatial distribution of the time of flight of the signal (e.g., an ultrasonic time of flight method).

This makes it possible to use a camera constructed even more simply or to provide a higher image resolution in comparison with a light pulse.

Alternatively or additionally, a different mechanism can also be used in order to provide the depth information. By way of example, the image capture device 102 can be configured to use a variable focus (autofocus) for determining the depth information. However, the focus can also be directed at a movable object (e.g., product and/or hand), such that the distance between the image capture device 102 and the object can be determined as depth information on the basis of the focus position. Alternatively or additionally, the depth information can be determined on the basis of an edge contrast measurement and/or a phase comparison.

The capture region 102e can comprise a plurality of partial regions (also referred to as zones). The plurality of zones can comprise for example a first zone 311a (also referred to as input zone 311a), in which a first placement device 302a of the SS checkout terminal 300 is arranged. The plurality of zones can comprise for example a second zone 311b (also referred to as placement zone 311b), in which a second placement device 302b of the SS checkout terminal 300 is arranged. The plurality of zones can comprise for example the product capture zone as third zone 311c (also referred to as scanning zone 311c). More generally, the zones can comprise a placement plane (e.g., a checkout table) as reference plane 902, on which the products can be placed and/or moved across it, as will be described in even more specific detail later.

Each placement device 302b, 302a can be configured in such a way that one or more than one product can be placed thereon. For this purpose, a placement device 302b, 302a can comprise for example a placement shelf, a placement hook for bags and/or a placement table. Optionally, each placement device 302b, 302a can have scales configured to detect a weight of the products placed on the placement device.

By way of example, it is possible to monitor three essential zones of product handling at the SS checkout terminal 300 by means of a 3D camera: a placement location 311a for products not yet captured (e.g., scanned), the product capture zone 311c (e.g., scanning zone), i.e., the partial region during scanning, and a placement location 311b for scanned products.

Optionally, the SS checkout terminal 300 can comprise an information output device 124, as will be described in even more specific detail later. The information output device 124 can be configured for example to output (e.g., audible or visible) information perceptible to humans, e.g., by means of an indicator device or a display device. The information can comprise for example a request and/or support for the user.

FIG. 4 illustrates a method 400 in accordance with various embodiments in a schematic flow diagram, e.g., implemented by means of the control device 106 of one of the SS checkout terminals 100 to 300.

The method 400 can comprise determining 401 the movement pattern 214m and determining the acceptability indication 214 on the basis thereof.

In general, the movement pattern 214m can represent a movement, i.e., a spatial change of a pose (i.e., the position and/or the orientation) of an object, e.g., of a product and/or a hand. In other words, the movement can comprise a rotation of the object and/or a displacement of the object. In an implementation with lower complexity, the movement pattern can represent the change in the presence of the object that is caused by the movement. The same can hold true for a plurality of objects of different types, e.g., for a hand 402 and/or for a product 404.

For this purpose, it is possible to process image data 202*b* of the capture region 102*e*, e.g., of one or more than one of its zones, having one or more than one object, e.g., the hand 402 and/or the product 404, or else no object (also referred to as empty). In general, the movement pattern 214*m* can comprise a juxtaposition of nodes which define the pattern of the movement. The nodes can optionally be parameterized, for example by means of one or more than one of the following properties: type of object; pose of the object before, during and/or after the movement, speed of the movement; acceleration of the movement; location of the movement, point in time of the movement; direction of the movement; number of objects; etc. The pose of the object can indicate for example the zone in which the movement begins, takes place or ends.

In one easily understandable example of a presence sequence, the movement can be simulated piecewise by means of discrete presence states as nodes. The nodes then indicate for example whether or what object (e.g., hand and/or product) is present. Such a presence sequence can comprise for example as nodes: [empty], [product with hand], [product].

In another easily understandable example of a trajectory, the movement can be or have been simulated piecewise by means of polynomials or movement directions. The points of the trajectory at which two polynomials or movement directions adjoin one another can form the so-called nodes of the trajectory. The nodes of the trajectory can be specified for example in a multidimensional coordinate system, e.g., by means of spatial vectors. Such a presence sequence can comprise for example as nodes: $[x_1, y_1, z_1]$, $[x_2, y_2, z_2]$, $[x_3, y_3, z_3]$, where $x_n$, $y_n$, $z_n$ are coordinates. Optionally, it is possible to omit the polynomials or movement directions and to use only the discrete poses of the object as nodes, without connecting the latter.

The nodes can optionally be determined zonewise, for example one or more than one first node for the first zone 311*a*, one or more than one second node for the second zone 311*b* and/or one or more than one third node for the third zone 311*c*. In this regard, more complex movements can be represented.

In another easily understandable example, the trajectory can indicate the type of object and (e.g., zonewise) a sequence of the presence of the object. Such a presence sequence can comprise for example as nodes: [type of object=product], [zone 1], [zone 2], [zone 3].

Although the trajectory can provide a very detailed representation of the movement, it may also require a high computational complexity. Therefore, it is also possible to use (e.g., as an alternative but also in addition to the trajectory) the less complex presence sequence, which will be explained in greater detail by way of example below. The movement pattern 214*m* can generally also be formulated differently, e.g., purely formally or by means of technical-physical parameters. The description given in respect of the presence sequence can analogously also apply to any differently formulated movement pattern 214*m*.

FIG. 5 illustrates a movement pattern 214*m* in accordance with various embodiments in a schematic diagram 500, e.g., implemented in accordance with the method 400 and/or by means of the control device 106 of one of the SS checkout terminals 100 to 300.

In 500, the movement pattern 214*m* can comprise a temporal sequence (also referred to as time sequence or sequence) of the presence of one or more than one object as presence sequence. The presence sequence can comprise concrete points in time (e.g., a time of day) of the presence or else merely be ordered chronologically. The presence sequence can comprise for example a chronologically ordered juxtaposition of presence states as nodes 501, 503, 505, 507. The presence states can optionally be parameterized, for example by means of a duration of the presence and/or the zone. The presence sequence can be determined for example zonewise, for example a first presence sequence for the first zone 311*a*, a second presence sequence for the second zone 311*b* and/or a third presence sequence for the third zone 311*c*.

Such an exemplary movement pattern 214*m* can comprise with regard to a zone (e.g., the first, second and/or third zone) the fact that no object is arranged in the zone in 501, only a product is arranged in the zone in 503, a product and a hand are arranged in the zone in 505, or only a hand is arranged in the zone in 507.

FIG. 6 illustrates a movement pattern 214*m* in accordance with various embodiments in a schematic diagram 600, e.g., implemented in accordance with the method 400 and/or by means of the control device 106 of one of the SS checkout terminals 100 to 300.

In 600, the presence states of the movement pattern 214*m* can be represented by means of a spatial change of an object (e.g., hand and/or product) between the zones of the capture region 102*e* as nodes 601, 603, 605. The presence sequence can comprise concrete points in time (e.g., a time of day) of the change or else merely be ordered chronologically. The nodes 601, 603, 605 can optionally be parameterized, for example by means of one or more than one of the following properties: duration of the presence, direction of the change, type of object (i.e., kind of object).

Examples of such a movement pattern 214*m* can comprise for example with regard to a zone (e.g., the first, second and/or third zone) the fact that the object leaves the zone in 601, enters the zone 311*b* in 603, and/or was moved between two zones in 605. In a different kind of formulation, the movement pattern 214*m* can indicate for example the zone-wise events in coded form, for example coded by means of a semaphore, as will be described in even more specific detail later.

It goes without saying that the above possibilities for the movement pattern 214*m* can also be combined with one another in order to make more accurate indications about the movement. Hereinafter, reference is made to the easily understandable temporal sequence of the presence of one or more than one object as presence sequence. The description can analogously also apply to a differently formulated movement pattern 214*m*.

FIG. 7 illustrates the process of determining 401 the movement pattern 214*m* in accordance with various embodiments in a schematic flow diagram 700, e.g., implemented in accordance with the method 400 and/or by means of the control device 106 of one of the SS checkout terminals 100 to 300.

In 701, it is possible to filter out data constituents from the image data 202*b* which represent the immobile (invariant) background of the capture region 102*e* (also referred to as object filtering or more generally as freeing). By way of example, a filter mask (also referred to as mask for simplification) can be used for object filtering.

A filter mask can comprise for example a graphics filter and a segmentation mask. The segmentation mask can indicate illustratively (e.g., pixelwise), e.g., by means of a brightness value, the data segments (e.g., pixels) of the image data 202b to which the graphics filter is intended to be applied or which are intended to be protected from an application of the graphics filter. By way of example, bright regions of the segmentation mask can represent the fact that the graphics filter is intended to be applied, and dark regions can indicate that the graphics filter is not intended to be applied, or vice versa. It goes without saying that gradations between bright and dark can also be used in order to attain a partial application of the graphics filter and/or a transition. The application of the graphics filter can comprise for example changing the color information 914, e.g., darkening it (e.g., by means of a black filter), replacing it (e.g., by means of a replacing filter) or removing it (e.g., by means of a removing filter). The mask can comprise the same pixel-related dimensions as the color information.

The mask can be superimposed on the color information, such that the freeing 701 is effected. The segmentation mask can be applied to a corresponding graphics filter as an intermediate step, for example, thereby attaining selective application of the graphics filter to the color information 914. The filtered image data 212b comprising the movable objects freed in accordance with the depth information in the capture region 102e are obtained as a result of the freeing 701.

As a result of the filtering outcome, additional image data 212b (also referred to as filtered image data 212b) can be provided, in which at least one or more than one movable object in the capture region (or a zone) is freed. The freeing 701 can comprise for example an image data segment (also referred to for short as data segment) that represents the background of the capture region 102e being masked and/or being discarded (e.g., not being used further in the course of determining the movement pattern).

The freeing 701 can comprise for example mapping the depth information onto the mask according to which the image data are masked. The mapping can be effected by means of a function, for example, which need not necessarily be continuous. A discontinuous function can provide for example a sharp transition between applying the graphics filter and protecting against the application thereof.

In 701, the freeing can be effected illustratively by means of processing the image data 202b. As an alternative or in addition thereto, however, the freeing 701 can also be effected focally, e.g., by using a small depth of field or high depth-of-field blur when capturing the image data. This achieves the effect that the background of the capture region 102e is imaged unsharply when focusing on the object. In this case, the image data 202b can already comprise the one or more than the one freed object. For focal freeing, it is possible to use an image capture device which provides a small depth of field (e.g., of a few centimeters). A small depth of field can be provided for example by means of a large image sensor (e.g., more than 2.5 cm) and/or a small f-number (e.g., less than 2). In more general terms, the hyperfocal distance of the image capture device 102 can be greater than the distance between the latter and the object or the reference plane. By way of example, the image sensor can have a diagonal extent that is larger than the depth of field. Hereinafter, reference is made to the processed image data. The description given can analogously apply to optically freed image data.

In accordance with various embodiments, the depth information can be used for freeing the movable objects arranged above the reference plane. The depth information can once again be determined by a stereoscopic camera. The latter determines the distance (illustratively depth) of specific image regions by way of the disparity of the different perspectives of the stereoscopic camera. The depth of field of the stereoscopic camera can, but need not necessarily, be used.

In connection with a stereo camera or determining depth information, the term disparity (also referred to as deviation) denotes a positional offset adopted by the same object in the imaging from two different perspectives. The focal points of the two lenses associated with the perspectives are at a distance b from one another. If both lenses have the focal length f, it holds true for the distance r between the object and the lenses (also referred to as depth) that r=b·f/d, where d denotes the disparity. The depth information r of an object can thus be determined on the basis of a determined disparity of the object in the stereo image. A disparity map of a stereo image is thus tantamount to a depth image indicating the spatial distribution of the depth information. The disparity map can be determined by means of a census transformation, for example.

In general, the freeing can be effected wholly or partly. The freeing can result in the contrast and/or the imaging sharpness of those data constituents of the image data which represent the background being reduced.

In one easily understandable example of freeing, the image data 202b are subdivided into data segments (also referred to as segmenting). By way of example, a first data segment 702 (illustrated in a hatched manner) can be determined, which represents an empty capture region 102e (or the zone thereof). In other words, the first data segment 702 can represent the environment. Furthermore, a second data segment 704 (also referred to as object data segment) can be determined, which represents one or more than one movable object (e.g., the hand and/or the product) in the capture region 102e (or the zone thereof). The first data segment 702 (also referred to as environment data segment) can for example be discarded, blackened or masked in some other way.

The freeing can be effected for example using the depth information (then also referred to as depth filtering). The depth information can indicate a depth for example pixel-wise, e.g., a distance from the image capture device 102 or some other reference object 902 (e.g., the reference plane 902). By way of example, those data constituents which have a large depth can be filtered out 701. Alternatively or additionally, those data constituents which have a small depth can be protected from the filtering out 701. The depth filtering is less sensitive to the prevailing light situation, to reflections, or to other disturbances in the capture region 102e. In more general terms, the depth filtering can comprise superposing the depth information and the color information of the image data on one another, such that those data constituents which have a large depth are filtered out 701.

As an alternative or in addition to the depth filtering, the freeing can be effected using the image data of the empty capture region (also referred to as comparison filtering). By way of example, those data constituents which correspond to the image data of the empty capture region can be filtered out.

As an alternative or in addition to the depth filtering and/or the comparison filtering, the freeing can be effected using the color information of the image data (also referred to as color filtering), for example the RGB information (red-green-blue information). By way of example, those data constituents which have a specific color (for example the color of the background) can be filtered out. The color filtering can be effected for example color channel by color channel, e.g., individually for the red channel, the blue channel and the green channel. It goes without saying that a different color space as RGB can also be used.

However, the comparison filtering and/or the color filtering may be susceptible to the current light situation and/or reflections and can therefore be used for example to support the depth filtering.

Preferably, the depth filtering can be effected (optionally together with the color filtering). Some other combination of a plurality of types of filtering out 701 can also be effected, e.g., a combination of depth filtering together with color filtering and/or comparison filtering. In general, a combination of different types of filtering out 701 makes it possible to obtain more information and/or a lower sensitivity to disturbances.

As a result of the filtering out 701, those data constituents can remain which represent a movable object in the capture region 102e, said object differing from the immobile (invariant) background of the capture region 102e. This makes it possible to optimize the quantity of data to be processed further, and to reduce error sources.

In 703, the filtered image data 212b can be classified (also referred to as classifying, more precisely as classing), i.e., can be assigned to one class 706 from a plurality of classes (also referred to as image class). The classifying can be effected on the basis of the filtered image data 212b, e.g., by means of object recognition or the like, as described above, which is supplied to the filtered image data 212b. The corresponding class can be assigned depending on what type of object is recognized on the basis of the filtered image data 212b.

Object recognition described herein can be effected by means of a trained algorithm, for example. The algorithm can be part of an artificial neural network (aNN), for example, as is described in more specific detail herein. As an alternative or in addition to the aNN, the object recognition can also be effected by means of edge recognition, transformation, size recognition and/or color recognition.

The plurality of image classes can comprise for example a first class (also referred to as "empty" class), which indicates that no movable object was recognized on the basis of the filtered image data 212b (i.e., the capture region 102e was empty). The plurality of image classes can comprise one or more than one non-empty class (also referred to as class "non-empty"), which indicates that one or more than one movable object was recognized. Examples of the non-empty class include: a second class (also referred to as "hand" class), which represents the fact that only a hand and/or no product was recognized; a third class (also referred to as "article" class), which represents the fact that only the product and/or no hand was recognized; a fourth class (also referred to as "hand with article" class), which represents the fact that a product and a hand were recognized.

In accordance with various embodiments, the classifying 703 can be effected by means of a trained processing algorithm (also referred to as a classification algorithm or simply a classifier). Examples of the training data for training the classification algorithm can comprise: image data of the empty recognition region, image data of the recognition region with hand, image data of the recognition region with product, image data of the recognition region with hand and product. Examples of a target variable for training the classification algorithm can comprise the plurality of image classes.

Alternatively or additionally possible examples of training data (also referred to as input vectors) can comprise the depth information also being used for the classifier or the classification, such that this illustratively need not necessarily be used only for the freeing.

Alternatively or additionally possible examples of target variables can comprise the "article" and "hand with article" classes being subdivided further in order to compare the appearance of the articles with one or more than one reference appearance. Put simply, it is possible to ensure that the article removed from the input zone actually arrives again in the output zone and is not swapped.

Examples of the processing algorithm can comprise various forms of machine learning for image classification, such as, for example:
  the so-called "histogram of oriented gradients" (HOG) in combination with a support vector machine (SVM);
  a pretrained aNN with "standard architecture" (e.g., GoogLeNet) which is furthermore adapted to the given problem by "transfer learning" and fine adaptation.

However, this last entails stringent hardware requirements for the given problem.

By way of example, the individual images of the image data are subdivided into the following images classes: "empty" class, (no objects are recognizable above the reference surface), "hand" class (a hand without an article is recognizable), "hand with article" class (a hand guiding an article is recognizable), "article" class (an object is lying on the reference surface of the first or second zone).

The classification algorithm can be configured for example to carry out the object recognition.

If the filtered (and thus reduced) image data 212b are fed to the classification algorithm, it is possible to use a less complex algorithm and/or a less powerful processor which executes the classification algorithm. Illustratively, the filtered image data 212b substantially only comprise those data portions which represent objects disjoint from the background, or are empty. Thus, the quantity of data to be processed is optimized and the classes are separated from one another to a greater extent.

In 705, the movement pattern 214m can be determined on the basis of a result 706 of the classifying 703, e.g., zonewise. For this purpose, for example, a sequence of image data can be fed to the classifying 703, such that a sequence of classes 706 is obtained.

The various zones can thus be examined for temporal sequences of images/classes. Examples of movement patterns 214m determined in this way can comprise:
  a juxtaposition ["empty" class], ["object" class], ["empty" class]. This movement pattern 214m can for example represent the fact that a product is introduced into a zone and removed again, e.g., during identifier capturing (e.g., scanning) of a product in the third zone 311c;
  a juxtaposition ["article" class], ["hand" class], ["hand with article" class], ["empty" class]. This movement pattern 214m can represent for example the fact that an article is removed from a zone.

By way of example, the components of the movement pattern 214m can indicate the classes thus determined, e.g., in the form [m], [n], [k] or [m], [n], [m], where m, n and k reference the respective class. In this way, the movement pattern can be indicated as a vector, for example, which can be processed more simply. Analogously, components of the movement pattern 214m can reference events determined therefrom, e.g., the event of moving a product out of the first zone 311a and/or into the second zone 311b.

In an implementation with lower complexity, the classification algorithm can, for example, only provide a differentiation between a product and hand. The "empty" class can be determined automatically, for example, if the filtered image data 212b are filtered (e.g., blackened) to the extent of more than 99%.

Optionally, a combination of one or more than one 3D camera and/or one or more than one RGB camera can be provided above the checkout table. A calibration algorithm can train (also referred to as training) the processing algorithm on the basis of the visible 3D geometry of the plurality of zones 311a, 311b, 311c (if the latter are empty) and approximates this 3D geometry through planes of varying relative distance. On the basis of the topology thus determined for the zones 311a, 311b, 311c to be monitored, an object situated above the reference plane 902 can be effectively freed from the background. This mechanism is more effective than a purely RGB image-based segmentation and is virtually independent of environment influences such as light projection, shadow casting and reflections. The resulting image data 212b can thus likewise be virtually independent of said influences or the location of the SS checkout terminal. This enables a robust classification of the image data without complex training of the algorithms for each individual location.

The calibration to the reference plane and thereby later freeing of objects can be effected independently of the classification of the preprocessed image data. By way of example, a classifier that was trained in a specific geometry after the freeing can also be applied in a different (e.g., similar) geometry without renewed training. As long as the geometry remains comparable, i.e., approximately the same distance between the relevant objects and the camera, the algorithm can be trained on one SS checkout terminal applying the schematic flow shown in diagram 700 (or else in a readjusted geometry) and be used on another SS checkout terminal applying the schematic flow shown in diagram 700. The calibration to the given reference plane ensures that the image data are not only independent of the environment, but also virtually independent of the concrete geometry of the SS checkout terminal applying the schematic flow shown in diagram 700.

FIG. 8 illustrates the process of determining 403 the acceptability indication 214 in accordance with various embodiments in a schematic flow diagram 800, e.g., implemented in accordance with the method 400 and/or by means of the control device 106 of one of the SS checkout terminals 100 to 300.

Hereinafter, reference is made to various deviation indications. A deviation indication can comprise a value from a value interval, wherein the lower end of the value interval represents a small deviation and the upper end of the value interval represents a high deviation, or vice versa. Alternatively or additionally, the deviation indication can comprise one class selected from a plurality of classes (also referred to as deviation classes). The plurality of deviation classes can comprise for example a first class "correspondence, a second class "difference" and optionally additional classes, such as gradations in between, for example. It goes without saying that other types of deviation indications can also be used.

The determining 403 can comprise, in 801, comparing the determined movement pattern 214m with one or more than one reference movement pattern 814m (also referred to as reference pattern). Each reference pattern can be determined for example on the basis of a predefined checkout process. The result of the comparing in 801 can comprise an indication 802 (also referred to as first deviation indication) about the deviation (also referred to as pattern deviation) between the movement pattern and the reference pattern.

The determining 403 can comprise, in 803, comparing the determined movement pattern 214m for consistency with the identifier capturing or with the captured product identifiers 202a. By way of example, if two products are moved but only the identifier of one product is captured, one product has possibly been misappropriated. If a temporal difference is within the events of moving in accordance with the movement pattern 214m and the identifier capturing is very large, there may possibly be an attempt at deceiving the SS checkout terminal. The result of the comparing in 803 can comprise an indication 804 (also referred to as second deviation indication) about the inconsistency between the movement pattern and the identifier capturing or the captured product identifiers 202a.

The determining 403 can comprise, in 805, comparing two determined movement patterns (e.g., of different zones such as referenced by 214m and 214m') for consistency with one another. By way of example, if two products are moved out of the first zone 311a but only one product is moved into the second zone 311b, one product has possibly been misappropriated. The result of the comparing in 805 can comprise an indication 806 (also referred to as third deviation indication) about the inconsistency between the two movement patterns 214m.

The determining 403 can comprise, in 807, comparing the movement pattern 214m for consistency with other sensor data (referenced at 852) of the SS checkout terminal, e.g., with sensor data of a placement device 302a, 302b, e.g., the scales thereof. By way of example, if two products are moved into the second zone 311b but only the weight of one of the products is captured by means of the second placement device 302b (e.g., the scales thereof), one product has possibly been misappropriated. The result of the comparing in 807 can comprise an indication 808 (also referred to as fourth deviation indication) about the inconsistency between the movement pattern 214m and the sensor data.

The process of determining 403 the acceptability indication 214 can be effected on the basis of one or more than one of the deviation indications above. By way of example, the latter individual or a plurality of (e.g., two, three or four) deviation indications together (e.g., in a form superimposed on one another) can be fed to the process of determining 403 the acceptability indication 214. The more deviation indications are used, the more reliable the acceptability indication 214. Preferably, the process of determining 403 the acceptability indication 214 can be effected on the basis of the first deviation indication 802 optionally together with one or more than one of the second to fourth deviation indications 804, 806, 808.

In one example, the scanning process (movement from the first zone 311a via the third zone 311c into the second zone 311b) of each product can be monitored and assessed on the basis of the movement pattern 214m together with the signals of the scanner 104 and optionally the security scales of the second placement device 302b. The assessment of the entire checkout process can then lead to a suspiciousness level and optionally to an intervention by personnel. Furthermore, the real-time monitoring of the checkout process enables targeted assistance in the form of light signals or screen instructions that support and speed up the checkout process. By way of example, the data gathered in the checkout process at many different cash registers can be used for a later analysis and in addition continuous optimization of the real-time evaluation described above.

In accordance with various embodiments, the process of determining 403 the acceptability indication 214 and/or the comparing 801, 803, 805, 807 can be effected by means of a trained algorithm (also referred to as consistency checking algorithm). Examples of training data for training the consistency checking algorithm can comprise: corresponding data from consistent checkout processes and/or from inconsistent checkout processes. Examples of a target variable for training the consistency checking algorithm can comprise the deviation indication and/or the acceptability indication.

In one example with lower complexity, a semaphore can be used (e.g., as an alternative to the consistency checking algorithm) in order to implement the comparing 801, 803, 805, 807. By way of example, a respective semaphore can be allocated to each of at least two partial processes of a scanning process and is incremented if the partial process has been captured. Examples of the partial processes of the scanning process can comprise: a movement out of the first zone 311a, a movement through the third zone 311c, a movement into the second zone 311b, registering of a weight difference in the first zone 311a or the second zone 311b, identifier capturing. The deviation indication can then represent deviations between the respective semaphores. Illustratively, it is possible to keep account of how many products are removed, scanned and put down again, and to check whether the number of products counted in each case corresponds.

In another example with lower complexity, a process of quantitatively determining 403 the acceptability indication 214 can be effected (e.g., as an alternative to the consistency checking algorithm). By way of example, the sum (or else the average value) of the deviation indications having an influence can be used as acceptability indication 214.

FIG. 9 illustrates an SS checkout terminal 900 in a method in accordance with various embodiments in a schematic side view. The SS checkout terminal 900 can be configured like one of the SS checkout terminals 100 to 300. The method can for example be configured in accordance with the method 400 and/or be or have been implemented by means of the control device 106 of the SS checkout terminal 900. The image data 202b captured by means of the image capture device 102 can comprise depth information 912 and (monochromatic or polychromatic) color information 914. The depth information 912 can be or have been provided for example by means of a stereo camera of the image capture device 102. The freeing 701 can be effected for example using the depth information 912 (also referred to as depth filtering).

A stereo camera can comprise a plurality of (e.g., two) lenses 102o arranged next to one another and directed at the capture region 102e. The plurality of lenses 102o can be configured to image the capture region 102e onto one or more than one image capture sensor of the image capture device 102. Illustratively, image data are thus captured which represent a plurality of perspectives of the capture region 102e at the same time (also referred to as stereoscopic image data), i.e., which represent the capture region 102e as viewed from different directions and/or from different locations. For this purpose, the exposure control and/or the focusing of the lenses can be coupled to one another, for example.

The depth information 912 can be determined on the basis of the stereoscopic image data of the capture region 102e. by way of example, the different perspectives of the stereoscopic image data can be superimposed on one another and the depth information can be derived therefrom. The description given for the stereoscopic image capture device 102 can analogously also apply to a differently configured image capture device 102 that implements a different mechanism in order to provide the depth information.

In general, the depth information 912 can comprise information which establishes a spatial relationship relating a plurality of image data constituents of the image data to one another and/or to a reference object 902, 102. The corresponding image data constituents can be assigned depth information representing the spatial relationship. By way of example, individual pixels (i.e., the depth information 912 can be resolved pixelwise) or a plurality of pixels (the so-called pixel group) can be used as image data segment. The reference object 902, 102 can comprise or be formed from the image capture device 102 and/or the reference plane 902, for example. By way of example, the depth information 912 can indicate pixelwise a distance from the reference object 902, 102.

The depth information 912 can be superimposed on the color information 914 or can be mapped thereto in some other way. The depth information 912 can be mapped 905 onto the filter mask 916, for example. The filter mask 916 can be provided as vector graphics or raster graphics according to the image data 202b, for example.

This makes it possible to filter out 701, for example those image data segments whose depth information satisfies a predefined (e.g., stored) criterion. The criterion can illustratively be satisfied if the depth information represents a small distance from the reference object such as the placement plane 902, or the image capture device 102, e.g., less than 10 cm. As a result of the filtering out 701, those image data segments 704 remain which represent an object such as a product 404, or a hand 402 within a layer 901 (also referred to as layer of interest 901) of the capture region 102e. The layer of interest 901 can be spatially separated from the reference object such as the placement plane 902, or the image capture device 102 e.g., from a layer not of interest 903 adjoining the reference object such as the placement plane 902, or the image capture device 102.

FIG. 10 illustrates a method 1000 in accordance with various embodiments in a schematic flow diagram, e.g., implemented in accordance with the method 400 and/or by means of the control device 106 of one of the SS checkout terminals 100 to 300 or 900. The method 1000 can comprise, in 1002, starting a checkout session 202, e.g., in response to the session start event.

The method 1000 can comprise, in 1001, capturing the beginning of a movement of a product 404, e.g., by a user of the SS checkout terminal (also referred to as movement beginning capturing). The beginning of the movement of the product can be determined by means of a movement pattern 214m. By way of example, the movement pattern 214m can represent (e.g., in the input zone 311a) successively a stationarily arranged product without a hand being captured, then the product with a hand being captured, and then neither a product nor a hand being captured. The movement pattern 214m can alternatively or additionally represent the product being moved out of the input zone 311a. The product can be arranged in the output zone 311a, for example, at the beginning of movement.

In response to the movement beginning capturing 1001, i.e., to the fact that the beginning of the movement of the product has been captured, for example a first semaphore can be incremented, e.g., a product picking-up counter can be increased by one. In response to the movement beginning capturing 1001, alternatively or additionally, a timer can be started. By way of example, it is possible to trigger an alarm after expiry of the timer (also referred to as time trigger or time switch) if no movement stop capturing 1005 takes place. In response to the movement beginning capturing 1001, information (also referred to as presentation information) indicating that a product is intended to be presented to the product capture device 104 can optionally be output by means of the information output device 124. The presentation information can comprise for example a corresponding request (e.g., text) and/or support (e.g., visible arrows).

The method 1000 can comprise, in 1003, capturing the product 404 being presented to the product capture device 104 (also referred to as presenting capturing 1003). The presenting capturing 1003 can be determined by means of a movement pattern 214m and/or if the identifier capturing takes place. By way of example, the movement pattern 214m can represent (e.g., in the scanning zone 311c) neither a product nor a hand being captured, then the product with a hand being captured, and then neither a product nor a hand being captured. The movement pattern 214m can alternatively or additionally represent the product being moved in the scanning zone 311c and/or through the latter. Upon the presenting capturing 1003, the product can for example be arranged in the scanning zone 311c and/or be moved therein. The presenting capturing 1003 can comprise for example capturing the product identifier 202a of the product 404 (then also referred to as product identifier capturing 1003) which is presented to the product capture device 104.

In response to the presenting capturing 1003, i.e., to the fact that the presenting of the product 404 to the product capture device 104 has been captured, for example a second semaphore can be incremented, e.g., a scan counter can be increased by one. In response to the presenting capturing 1003, alternatively or additionally, it is possible to capture the status of the timer (e.g., the time that has elapsed up until then) at the point in time of the presenting capturing 1003. By way of example, the temporal interval between the presenting capturing 1003 and the movement beginning capturing 1001 can be captured. By way of example, the indication about trustworthiness can additionally be based on the status of the timer upon presenting capturing 1003.

In response to the presenting capturing 1003, information (also referred to as placement information) indicating that the product is intended to be moved into the placement zone 311b can be output for example by means of the information output device 124. The placement information can comprise for example a corresponding request (e.g., text) and/or support (visible arrows).

The method 1000 can comprise, in 1005, capturing the ending of the movement of a product 404, e.g., by a user of the SS checkout terminal (also referred to as movement end capturing). The end of the movement of the product can be determined by means of a movement pattern 214m. By way of example, the movement pattern 214m can represent (e.g., in the placement zone 311b) successively neither a product nor a hand being captured, then the product with a hand being captured, and then a stationarily arranged product being captured. The movement pattern 214m can alternatively or additionally represent the product being moved into the placement zone 311b. The product can be arranged in the placement zone 311b, for example, upon the end of movement.

In response to the movement end capturing 1005, i.e., to the fact that the ending of the movement of the product has been captured, for example a third semaphore can be incremented, e.g., a product placement counter can be increased by one. In response to the movement end capturing 1005, it is possible to capture the status of the timer (e.g., the time that has elapsed up until then) at the point in time of the movement end capturing 1005

By way of example, the temporal interval between the movement end capturing 1005 and the movement beginning capturing 1001 can be captured. By way of example, the indication about trustworthiness can additionally be based on the status of the timer upon movement end capturing 1005. In response to the movement end capturing 1005, the timer can optionally be ended.

In response to the movement end capturing 1005, information (also referred to as continuation information) indicating that the next product can be presented to the product capture device can be output for example by means of the information output device 124. The continuation information can comprise for example a corresponding request (e.g., text) and/or support (e.g., visible arrows).

The method 1000 can comprise, in 1007, carrying out additional movement beginning capturing 1001. By way of example, a sequence 1007 comprising the movement beginning capturing 1001, the presenting capturing 1003 and the movement end capturing 1005 can be repeated continuously until the session end event is captured.

The method 1000 can comprise, in 1009, determining the payment information on the basis of each product identifier which has been determined during the checkout session 202 (also referred to as payment information determining 1009). The payment information determining 1009 can comprise for example determining a price assigned to each captured product identifier or summing a plurality of such prices. The payment information determining 1009 can optionally also be part of the sequence 1007.

The method 1000 can comprise, in 1011, determining the indication about the trustworthiness of the payment information (also referred to as trustworthiness determining 403). The indication about the trustworthiness of the payment information can be determined on the basis of one or more than one movement pattern 214m used for the movement beginning capturing 1001, for the presenting capturing 1003 and/or for the movement end capturing 1005. The indication about the trustworthiness of the payment information can optionally be determined on the basis of one or more than one status of the timer upon the presenting capturing 1003 and/or upon the movement end capturing 1005. The indication about the trustworthiness of the payment information can optionally be determined on the basis of a status of one or more than one semaphore (e.g., the comparison thereof), e.g., on the basis of the first semaphore, the second semaphore and/or the third semaphore. By way of example, a difference between a plurality of semaphores or some other statistical variable of the plurality of semaphores can be taken into account (if present). As an alternative or in addition to the difference, more generally speaking it is also possible to use some other result of a comparison between a plurality of semaphores.

The indication about the trustworthiness of the payment information can be updated, for example, continuously, e.g., iteratively and/or during each sequence 1007. Alternatively or additionally, it is also possible to determine a trustworthiness of the payment information for the entire checkout session 202.

The method 1000 can comprise, in 1004, ending the checkout session 202, e.g., in response to the session end event. By way of example, the user can input by what method (also referred to as payment method) the user would like to pay, and settle the costs in accordance with the payment information by means of the selected payment method (e.g., by way of direct debit, by way of credit card, by means of cash, etc.).

Optionally, the data (e.g., movement patterns, identification data, times and/or image data, etc.) that have been captured during the checkout session 202 can be stored.

These data can be used for example as training data for the classification algorithm, the consistency checking algorithm and/or the object recognition algorithm.

If the acceptability indication 214 satisfies a predefined (e.g., stored) criterion, an alarm can be triggered. The criterion can represent the trustworthiness being unacceptable (e.g., too low). This makes it possible to inform an employee about the trustworthiness of the payment information being in question (i.e., being dubious).

FIG. 11 illustrates an SS checkout terminal 1100 in a method in accordance with various embodiments in a schematic side view, for example configured in accordance with the method 400 and/or implemented by means of the control device 106. The SS checkout terminal 1100 can be configured to capture 3D information (also referred to as depth information) and color information simultaneously by means of the image capture device 102, e.g., the one or more than one camera thereof. The control device 106 can be configured to subdivide the image data (e.g., the color information thereof) into different data segments and/or to classify these.

The 3D information can be used for example to segment the color information and to emphasize relevant data segments, e.g., those which represent one or more than one hand and/or one or more than one product. The segmented image data can be fed to the classifier of the control device 106. The classifier can for example comprise or be formed from a neural network, e.g., a convolutional neutral network, as will be described in even more specific detail later.

In response to recognizing one or more than one hand in the recognition region 102e, e.g., in the various zones 311a, 311b, 311c of the recognition region 102e, one or more than one event can be triggered. The one or more than one event can comprise for example the initiating of the timer and/or the incrementing of a semaphore. The one or more than one event can optionally comprise estimating the movement 1101 (also referred to as handling) of the product over the course of time. By way of example, the handling that has already occurred can be estimated from events that have already occurred. Determining the movement pattern 214m can be made simpler with the use of a small number (e.g., four) of classes and the freeing (filtering out the background, i.e., the environment). By way of example, as a result, degrees of freedom are eliminated and the convergence behavior of the acceptability indication 214 is improved. This makes it possible to use a highly task-optimized and efficient aNN as algorithm.

FIG. 12 illustrates the SS checkout terminal 1200 in a method in accordance with various embodiments in a schematic side view, which is configured in a similar manner to the SS checkout terminal 1100, with the image capture device 102 comprising a plurality of stereo cameras. A plurality of stereo cameras makes it possible to monitor more zones or a larger region and/or to monitor the scanning zone 311c multiply (illustratively doubly) in order thus to attain a greater robustness.

FIG. 13 illustrates a method 1300 in accordance with various embodiments in a schematic flow diagram, for example configured in accordance with the method 400 and/or implemented by means of the control device 106.

The method 1300 can comprise, in 1301, calibrating the more or each a processing algorithm. The calibrating 1301 may be necessary for example only once, e.g., upon the system start and/or after assembly of the SS checkout terminal, and may be omitted later. Alternatively or additionally, the calibrating 1301 can be repeated, e.g., in quiescent phases of the SS checkout terminal. The calibrating 1301 can comprise capturing first image data of the empty capture region 102e (e.g., the reference plane thereof) by means of the image capture device 102. The first image data can comprise depth information 912 and/or color information 914 (e.g., both captured simultaneously) (also referred to as reference depth information and/or reference color information, respectively). The reference plane 902 can for example be planar and therefore have no or only little topography (also referred to as 3D structure). The first image data of the empty capture region 102e can be stored and/or used as reference image data for the processing algorithm (e.g., the object recognition algorithm and/or the classification algorithm).

The calibrating 1301 can be effected by means of the classification algorithm, which determines for example one or more than one set of reference depth information and/or reference color information and/or one or more than one reference pattern.

The method 1300 can comprise, in 1303, capturing by means of the image capture device 102 second image data 202b' of (e.g., comprising) the capture region 102e (e.g., the reference plane thereof), in which a hand and/or a product (also referred to as article) are/is arranged. The second image data 202b' can comprise depth information 912 and/or color information 914 (e.g., both captured simultaneously). The depth information 912 can represent for example the topography above the reference plane 902 by means of a bright/dark gradation.

The method 1300 can comprise, in 701, applying the object filtering to the second image data 202b'. Third image data 212b' (also referred to as segmented image data 212b') can be provided as a result of the object filtering 701. The third image data 212b' can comprise one or more than one object data segment of the second image data 202b' which represents one or more than one movable object (e.g., the hand 402 and/or the product 404) in the capture region 102e (or the zone thereof).

The object filtering 701 can for example comprise masking the color information pixelwise in accordance with the depth information. By way of example, each pixel of the color information can be masked in this way. The masking can comprise blackening those pixels of the color information whose depth information items substantially correspond to the reference plane (which for example illustratively do not lie above the reference plane). As a result of the masking, it is possible for only the pixels of the one or more than one object data segment not to be black and for the remaining pixels to be black.

The method 1300 can comprise in 703, carrying out the process of classifying the third image data 212b (i.e. the segmented image data). The classifying 703 can be effected for example by means of a classifier 1307, e.g., by means of an aNN. As a result of the classifying 703, one class 706 from a plurality of (e.g., two or more, e.g., exactly three) classes can be assigned to the third image data. The plurality of classes can comprise for example: "empty" (also referred to as "nothing"), the class "hand" and the class "article and hand".

FIG. 14 illustrates the classifier 1307 in accordance with various embodiments in a schematic construction diagram 1400, for example configured in accordance with the method 400 and/or implemented by means of the control device 106. The classifier 1307 can be configured as a convolutional neural network. It goes without saying that a differently configured classifier 1307 which provides the corresponding functions can also be used.

The classifier 1307 can comprise a plurality of layers ("Layer"), e.g., at least one input layer 1402 ("Input Layer"), at least one output layer 1404 ("Classification Layer", also referred to as termination layer) and one or more than one processing layer 1406, 1408 between them. The input layer 1402 can define for example a resolution of the incoming image data (here by way of example 120×106 pixels) and/or a color space for the color information of the incoming image data (here by way of example RGB). As an alternative or in addition to RGB (red-green-blue color space), it is also possible to use any other color space which is suitable for the classifier 1307, e.g., some other technical-physical color space such as CMYK (cyan-magenta-yellow-black color space) or else a perceptual color space (which describes for example features such as brightness, saturation and hue).

If a convolutional neutral network is used as classifier 1307, the one or more than one processing layer can comprise at least one convolutional layer 1406 ("Convolutional Layer") and at least one intermediate layer 1408 ("Fully Connected Layer"). Optionally, between the at least one convolutional layer 1406 and the at least one intermediate layer 1408 (also referred to as fully connected layer), a pooling layer ("Pooling Layer") can be connected (not illustrated).

The incoming image information can be for example multidimensional, e.g., can be represented by means of a corresponding matrix (e.g., the pixels of a grayscale or color image). The matrix (also referred to as tensor in the case of more than three dimensions) can for example reference a first spatial coordinate (e.g., x-coordinate) in a first dimension, for example reference a second spatial coordinate (e.g., y-coordinate) in a second dimension, for example reference the color information (e.g., a point in the color space) in one or more than one third dimension and for example reference the depth information (e.g., z-coordinate) in a fourth dimension. The coordinate of the depth information can be referenced for example along a direction that runs along the direction of capturing the image data and/or transversely with respect to the reference plane 902.

According to the dimension of the image information, the nodes of each convolutional layer 1406 can also be arranged multidimensionally. Optionally, the object filtering can comprise removing the dimension of the depth information in order to form the filtered image data. Alternatively or additionally, the object filtering can comprise replacing with zeros those entries of the color information of the tensor at which the depth information exceeds a threshold value.

The activity of each node of a convolutional layer 1406 can be calculated by means of a discrete convolution. The discrete convolution of each node can be converted into an output of the node by an activation function. By way of example, an ReLU function can be used as activation function. In the context of artificial neural networks or training methods, an ReLU function (also referred to as rectifier function or else as ReLU for short) is an activation function that is essentially defined as the positive part of its argument.

A plurality of parameters control the scope of the output (also referred to as output volume) of a convolutional layer 1406, for example the parameters of filter number ("depth"), stride ("Stride") and padding ("Padding" or "Null-Padding").

The filter number corresponds to the number of filters (here by way of example 18 filters or 12 filters) which are used, each of the filters being trained to search for something different in the input data of the convolutional layer 1406. The size of a filter can be specified in pixels (here by way of example 7×7 pixels or 5×5 pixels). If for example the image data in the raw data format (also referred to as raw image data) are fed as input data to the first convolutional layer 1406, it is possible to activate different nodes along the depth dimension in the presence of different oriented edges or color spots. The stride indicates how far a filter is displaced. If the stride is equal to 1, then a filter is displaced by one pixel. If the stride is 2 or 3, then the filter is displaced by 2 or 3 pixels, respectively, all at once. Spatially smaller output volumes are produced as a result. In the progression from the input to the output of the classifier 1307, the stride of the convolutional layers 1406 can decrease (here by way of example from 3 to 1). By means of the null-padding, input data can be filled with zeros at the edge. This allows the spatial size of the output data of a convolutional layer 1406 to be controlled.

The at least one (i.e. one or more than one) termination layer 1404 can terminate the network according to the architecture of the multilayer perceptron. The number of nodes (here by way of example 64) of an intermediate layer 1408 corresponds for example to the number of (object) classes which the respective intermediate layer 1408 is intended to distinguish. This, highly redundant, so-called 1-out-of-n encoding ("One-Hot-encoding") has the advantage that implicit assumptions about similarities of classes do not necessarily have to be made.

This termination layer 1404 has for example three nodes for three classes ("nothing", "hand", "article and hand"). The upstream intermediate layer 1408 is a so-called hidden layer ("hidden layer"). This intermediate layer 1408 makes it possible to map different decision paths between the last convolutional layer 1406 and the actual classification 1404.

Illustratively, one of the block blocks 1406 that define convolutional layers can provide the function of feature extraction ("feature extraction") and the one or more than one fully connected intermediate layer 1408 connected downstream of this block can provide the function of decision making ("decision making"), e.g., on the basis of the previously extracted features. These features, or the presence thereof in different regions, could also be transferred directly to the termination layer 1404, although this limits the possible decision paths and may not be sufficient under certain circumstances, depending on boundary conditions present.

A neural network of similar size as classifier 1307, which neutral network solves problems that are more generally valid, comprises two or more of such intermediate layers 1408 for decision making.

Since an intermediate layer 1408 accepts the most parameters, it is susceptible to overfitting. In order to counteract this overfitting, a so-called dropout rate p ("dropout rate") can be predefined for this. For this purpose, for each training phase individual nodes are removed from the network with the probability 1-p (here by way of example p=0.5) or are retained with the probability p, such that a reduced network remains. In the training phase, only the reduced network is then trained on the data of this training phase. After the training phase, the removed nodes are added to the network again with their original weights.

The output layer 1404 (also referred to as classification layer) can promote the output of the at least one intermediate layer 1408 into the corresponding classes. By way of example, the output layer 1404 can output a K-dimensional vector σ (here K is by way of example 3) and a softmax function can be used as activation function. The so-called softmax function (also referred to for short as softmax or as a normalized exponential function) is a generalization of the logistic function that transforms a K-dimensional vector with real components into a K-dimensional vector σ likewise as a vector of real components in the value range (0, 1) with the components adding up to 1.

Examples of the training data for training the classifier 1307 can comprise: image data of the empty recognition region, image data of the recognition region with hand, image data of the recognition region with product, image data of the recognition region with hand and product. Examples of a target variable for training the classifier 1307 can comprise the plurality of image classes.

Alternatively or additionally possible examples of training data can comprise the depth information also being used for training the classifier 1307, such that this illustratively need not necessarily be used only for the freeing.

Alternatively or additionally possible examples of target variables for training the classifier 1307 can comprise the "article" and/or the "hand with article" classes being subdivided further in order to compare the appearance of the articles with one or more than one reference appearance. Put simply, it is possible to ensure that the article removed from the input zone actually arrives again in the output zone and is not swapped.

Examples of the classifier 1307 can comprise various forms of machine learning for image classification, such as, for example:
- the so-called "histogram of oriented gradients" (HOG) in combination with a support vector machine (SVM);
- a pretrained aNN with "standard architecture" (e.g., GoogLeNet) which is furthermore adapted to the given problem by "transfer learning" and fine adaptation.

However, this last entails stringent hardware requirements for the given problem.

Various examples are described below which refer to what has been described above and what is illustrated in the figures.

Example 1 is a SS checkout terminal comprising: an image capture device configured to capture image data of a capture region; a product capture device for capturing a product identifier of a product in the capture region when the product is presented to the product capture device; a control device configured for example: for determining payment information on the basis of the product identifier; for determining a movement pattern on the basis of the image data, wherein the movement pattern represents a movement (e.g., of one or more than one object, e.g., of a product and/or of a hand) in the capture region; for determining an indication about a trustworthiness of the payment information on the basis of the movement pattern, wherein the object is for example the or a product.

Example 2 is a method, for example implemented by means of the control device of the SS checkout terminal in accordance with example 1, comprising: determining payment information on the basis of a product identifier of a product, wherein the product identifier is provided by means of a product capture device; determining a movement pattern on the basis of the image data of a capture region (wherein the image data are provided by an image capture device, for example), wherein the movement pattern represents a movement (e.g., of one or more than one object, e.g., of a product and/or of a hand) in the capture region; determining an indication about a trustworthiness of the payment information on the basis of the movement pattern, wherein the object is for example the or a product.

Example 3 is a method, e.g., the method in accordance with example 2 and/or implemented by means of the control device of the SS checkout terminal in accordance with example 1, the method comprising: determining payment information on the basis of a product identifier of a product in a capture region; filtering image data of the capture region on the basis of depth information of the capture region; the method furthermore comprising: determining an indication about a trustworthiness of the payment information on the basis of a result of the filtering, and/or determining a movement pattern on the basis of the result of the filtering, wherein the movement pattern represents a movement (e.g., of one or more than one object, e.g., of a product and/or of a hand) in the capture region and for determining the indication, wherein the object is for example the or a product.

Example 4 is the SS checkout terminal in accordance with example 1 or respectively the method in accordance with example 2 or 3, wherein determining the indication comprises comparing the movement pattern with a stored reference movement pattern.

Example 5 is the method or respectively the SS checkout terminal in accordance with example 4, wherein the indication represents a degree of correspondence between the movement pattern and the reference movement pattern.

Example 6 is the method or respectively the SS checkout terminal in accordance with any of examples 1 to 5, wherein the image data are captured during the process of capturing the product identifier; and/or wherein the image data are captured during a checkout session, wherein the checkout session takes account of the payment information.

Example 7 is the method or respectively the SS checkout terminal in accordance with any of example 1 to 6, wherein determining the indication comprises taking account of a temporal relation between the movement of the product and the capturing of the product identifier.

Example 8 is the method or respectively the SS checkout terminal in accordance with example 7, wherein the indication represents a degree of temporal correspondence between the movement of the object (e.g., of the product) and the capturing of the product identifier.

Example 9 is the method or respectively the SS checkout terminal in accordance with any of examples 1 to 8, wherein the movement pattern comprises information about a temporal and/or spatial sequence of the movement (e.g., a pose of the object in relative terms in the capture region).

Example 10 is the method or respectively the SS checkout terminal in accordance with any of examples 1 to 9, wherein the movement pattern comprises information about a presence and/or absence of the object (e.g., product) in the capture region or a partial region thereof.

Example 11 is the method or respectively the SS checkout terminal in accordance with any of examples 1 to 10, wherein each movement pattern is (e.g., only) related to a partial region of the capture region, and wherein the movement pattern represents for example whether the movement takes place into the partial region and/or out of the latter (e.g., through the latter), or whether the movement takes place within the partial region.

Example 12 is the method or respectively the SS checkout terminal in accordance with any of examples 1 to 11, wherein the capture region comprises a plurality of partial regions, and the movement pattern comprises information which represents the movement taking place into at least one of the plurality of partial regions, out of this partial region or between two partial regions of the plurality of partial regions.

Example 13 is the method or respectively the SS checkout terminal in accordance with any of examples 1 to 12, wherein determining the movement pattern is effected on the basis of depth information of the capture region (wherein, for example, the image capture device is furthermore configured to capture the depth information).

Example 14 is the method or respectively the SS checkout terminal in accordance with example 13, wherein determining the movement pattern comprises filtering the image data (e.g., the color information thereof) of the capture region on the basis of the depth information, wherein (e.g., only) the filtered image data are used for determining the movement pattern.

Example 15 is the method or respectively the SS checkout terminal in accordance with example 14, wherein the filtering comprises determining at least one first data segment (also referred to as segmenting) representing at least one (e.g., movable) object, and determining a second data segment representing an environment of the at least one object, wherein at least one object comprises the product and/or a hand.

Example 16 is the method or respectively the SS checkout terminal in accordance with any of examples 1 to 15, wherein determining the movement pattern (e.g., filtering) comprises filtering out the second data segment and/or providing the first data segment freed of the second data segment.

Example 17 is the method or respectively the SS checkout terminal in accordance with any of examples 1 to 16, wherein determining the movement pattern is effected on the basis of additional image data comprising the first data segment freed of the second data segment.

Example 18 is the method or respectively the SS checkout terminal in accordance with any of examples 1 to 17, wherein a or the first data segment of the image data furthermore represents a hand that guides the movement of the object (e.g., product).

Example 19 is the method or respectively the SS checkout terminal in accordance with any of examples 1 to 18, wherein the capture region comprises a plurality of zones (also referred to as partial regions).

Example 20 is the method or respectively the SS checkout terminal in accordance with any of examples 1 to 19, wherein determining the movement pattern comprises classifying the image data (e.g., zonewise, e.g., individually for each zone of the capture region), and wherein for example the movement pattern is determined on the basis of a result of the classifying.

Example 21 is the method or respectively the SS checkout terminal in accordance with example 20, wherein the classifying comprises assigning (e.g., exactly) one class from a plurality of classes to the image data, of which classes at least one class represents an (e.g., movable) object (e.g., the product and/or the hand) being arranged in a partial region of the capture region and an additional class represents the partial region as being empty (e.g., the hand and/or the product are not arranged in the partial region of the capture region).

Example 22 is the method or respectively the SS checkout terminal in accordance with any of examples 1 to 21, wherein determining the movement pattern (e.g., classifying) is effected on the basis of the filtered image data (e.g., uses only the first data segment).

Example 23 is the method or respectively the SS checkout terminal in accordance with any of examples 1 to 22, wherein of the plurality of classes: a first class represents the object (e.g., product) being arranged in a partial region; a second class represents the hand being arranged in a partial region; and/or a third class represents the hand and the object (e.g., product) being arranged in a partial region.

Example 24 is the method or respectively the SS checkout terminal in accordance with any of examples 1 to 23, wherein the image data comprise depth information and/or (e.g., monochromatic or polychromatic) color information of the capture region, wherein the filtering and/or the classifying are/is effected on the basis of the depth information, wherein the filtering comprises mapping the depth information onto the color information.

Example 25 is the method or respectively the SS checkout terminal in accordance with any of examples 1 to 24, wherein the image data comprise (e.g., monochromatic or polychromatic) color information, wherein for example the classifying is effected on the basis of the (e.g., filtered) color information.

Example 26 is the method or respectively the SS checkout terminal in accordance with any of examples 1 to 25, wherein the color information is captured at the same time as the depth information.

Example 27 is the method or respectively the SS checkout terminal in accordance with any of examples 1 to 26, wherein determining the movement pattern (e.g., filtering) comprises mapping depth information of the capture region onto color information of the image data (e.g., continuously or discretely), wherein the filtering is effected for example using a filter mask (also referred to as masking the image data), onto which the depth information is mapped.

Example 28 is the method or respectively the SS checkout terminal in accordance with any of examples 1 to 27, wherein determining the movement pattern (e.g., classifying and/or filtering) is effected by means of a processing algorithm, which is for example a trained processing algorithm, wherein the processing algorithm is trained for example on the basis of image data of the (e.g., empty) capture region, wherein the processing algorithm is trained for example on the basis of image data of the capture region in which an object (e.g., a product) is arranged and/or is moved by a hand.

Example 29 is the method or respectively the SS checkout terminal in accordance with any of examples 1 to 28, for outputting perceptible (perceptive) information (e.g., by means of an information output device of the SS checkout terminal), wherein for example as information: first information is output if the movement pattern represents a beginning of the movement, wherein the first information indicates that the product is intended to be presented to the product capture device; and/or second information is output if the product identifier is captured, wherein the second information indicates where the product is intended to be moved to; and/or third information is output if the movement pattern represents an end of the movement, wherein the third information indicates that an additional product is intended to be presented to the product capture device.

Example 30 is the method or respectively the SS checkout terminal in accordance with any of examples 1 to 29, comprising initiating a payment transaction in accordance with the payment information (e.g., by means of a payment means terminal of the SS checkout terminal), wherein initiating the payment transaction is effected for example only if the indication about trustworthiness satisfies a predefined (e.g., stored) criterion and/or otherwise an alarm signal is output which for example represents the trustworthiness of the payment information being dubious.

Example 31 is code segments configured, when executed by a processor, to carry out the method in accordance with any of examples 2 to 30.

Example 32 is a control device configured to carry out the method in accordance with any of examples 2 to 30.

Example 33 is an SS checkout terminal comprising: an image capture device configured to capture image data of a capture region; a product capture device for capturing a product identifier of a product in the capture region if the product is presented to the product capture device; and the control device in accordance with example 32.

The invention claimed is:

1. A self-service checkout terminal comprising:
an image capture device configured to capture image data of a capture region;
a product capture device configured to capture a product identifier of a product in the capture region when the product is presented to the product capture device;
a control device communicating with the image capture device and the product capture device and configured to:
determine payment information on the basis of the product identifier captured by the product capture device,
determine a movement pattern of the product on the basis of the image data captured by the image capture device, wherein the movement pattern represents a movement of the product in the capture region,
determine an indication about a trustworthiness of the payment information on the basis of the movement pattern,
wherein the control device is further configured to determine the movement pattern on the basis of depth information of the capture region, wherein the image capture device is furthermore configured to capture the depth information; and
wherein the control device is further configured to, when determining the movement pattern, filter the image data of the capture region by superposing the depth information and the color information of the image data on one another, and wherein the determination of the movement pattern is based on a result of the filtered image data.

2. The self-service checkout terminal as claimed in claim 1 wherein the control device is further configured to, when determining the indication, compare the movement pattern with a stored reference movement pattern.

3. The self-service checkout terminal as claimed in claim 1 wherein the control device is further configured to, when determining the indication, account for a temporal relation between the movement of the product and the capturing of the product identifier.

4. The self-service checkout terminal as claimed in claim 1 wherein the control device is further configured to, when determining the indication, account for a spatial sequence of the movement of the product through a plurality of zones of the capture region.

5. The self-service checkout terminal as claimed in claim 1, wherein the control device is further configured to, when filtering the image data, determine at least one first data segment representing at least the product and determining a second data segment representing an environment of the product.

6. The self-service checkout terminal as claimed in claim 5, wherein the control device is further configured to, when filtering the image data, filter out the second data segment.

7. The self-service checkout terminal as claimed in claim 1 wherein the movement pattern represents whether the movement takes place into or out of the partial region.

8. The self-service checkout terminal as claimed in claim 1 further comprising: a payment means terminal configured to carry out a payment transaction, wherein the control device is furthermore configured to initiate the payment transaction in accordance with the payment information if the indication about the trustworthiness satisfies a predefined criterion and otherwise to output an alarm signal.

9. A self-service checkout terminal comprising:
an image capture device configured to capture image data of a capture region; a product capture device configured to capture a product identifier of a product in the capture region when the product is presented to the product capture device;
a control device communicating with the image capture device and the product capture device and configured to:
determine payment information on the basis of the product identifier captured by the product capture device;
determine a movement pattern of the product on the basis of the image data captured by the image capture device, wherein the movement pattern represents a movement of the product in the capture region;
determine an indication about a trustworthiness of the payment information on the basis of the movement pattern;
wherein the image capture device is furthermore configured to capture the depth information;
wherein the movement pattern comprises classified filtered image data and;
wherein the filtered image data is filtered by superposing the depth information and the color information of the image data on one another, and the classified filtered image data is classified by assigning one class to the filtered image data from a plurality of classes fewer than 5 wherein one class represents the product arranged in a partial region of the capture region and another class represents the partial region when empty.

10. The self-service checkout terminal as claimed in claim 9 wherein the image data is classified by a processing algorithm trained on the basis of image data of the capture region.

11. A method comprising:
determining, with a processor, payment information on the basis of a product identifier of a product in a capture region that is capture by a product capture device;
determining, with the processor, a movement pattern of the product on the basis of an image data of the capture region, the image data captured by an image capture device, wherein the movement pattern represents a movement of the product in the capture region;
determining, with the processor, an indication of a trustworthiness of the payment information on the basis of the movement pattern; and
filtering the image data of the capture region by superposing depth information of the capture region and color information of the image data on one another, the depth information captured by an image capture device wherein said determining the movement pattern is based on a result of said filtering.

* * * * *